(12) United States Patent
Sasaki et al.

(10) Patent No.: US 11,331,635 B2
(45) Date of Patent: May 17, 2022

(54) MINUTE BUBBLE GENERATOR, HOME APPLIANCE PROVIDED WITH MINUTE BUBBLE GENERATOR, AND METHOD OF MANUFACTURING MINUTE BUBBLE GENERATOR

(71) Applicant: Toshiba Lifestyle Products & Services Corporation, Kawasaki (JP)

(72) Inventors: Hironori Sasaki, Kawasaki (JP);
Satoshi Nagai, Kawasaki (JP);
Yasuhiro Komori, Kawasaki (JP);
Tomonori Uchiyama, Kawasaki (JP);
Hiroshi Nishimura, Kawasaki (JP)

(73) Assignee: Toshiba Lifestyle Products & Services Corporation, Kawasaki (JP)

( * ) Notice: Subject to any disclaimer, the term of this patent is extended or adjusted under 35 U.S.C. 154(b) by 195 days.

(21) Appl. No.: 16/437,418

(22) Filed: Jun. 11, 2019

(65) Prior Publication Data

US 2019/0329193 A1 Oct. 31, 2019

Related U.S. Application Data

(63) Continuation of application No. PCT/JP2017/027875, filed on Aug. 1, 2017.

(30) Foreign Application Priority Data

Dec. 21, 2016 (JP) .............................. JP2016-247983

(51) Int. Cl.
*B01F 23/23* (2022.01)
*B01F 23/232* (2022.01)
(Continued)

(52) U.S. Cl.
CPC .......... *B01F 23/232* (2022.01); *B01F 25/441* (2022.01); *B01F 31/81* (2022.01);
(Continued)

(58) Field of Classification Search
CPC .. B01F 5/0662; B01F 3/0446; B01F 11/0208; B01F 15/00922; B01F 2003/04872;
(Continued)

(56) References Cited

U.S. PATENT DOCUMENTS

2014/0151470 A1* 6/2014 Katou ................... B01F 5/0663
239/589

FOREIGN PATENT DOCUMENTS

| CN | 101795757 A | 8/2010 |
| CN | 103747858 A | 4/2014 |

(Continued)

OTHER PUBLICATIONS

"Snap fit design" published Nov. 17, 2014 accessed at <https://web.archive.org/web/20141117105528/http://www.gotstogo.com/misc/engineering_info/snap_design.htm> (Year: 2014).*

(Continued)

*Primary Examiner* — Stephen Hobson
(74) *Attorney, Agent, or Firm* — Oblon, McClelland, Maier & Neustadt, L.L.P.

(57) ABSTRACT

A minute bubble generator includes a flow path member including a flow path allowing a liquid to pass therethrough; and a colliding part provided in the flow path and generating minute bubbles in the liquid passing through the flow path by locally reducing a cross sectional area of the flow path. The colliding part is formed integrally with the flow path member and is provided closer to an upstream end or a downstream end relative to a lengthwise center of the flow path.

9 Claims, 21 Drawing Sheets

(51) Int. Cl.
*D06F 35/00* (2006.01)
*D06F 39/08* (2006.01)
*B01F 25/441* (2022.01)
*B01F 31/81* (2022.01)
*B01F 35/10* (2022.01)
*B29C 45/14* (2006.01)
*B29K 101/12* (2006.01)
*B29L 23/00* (2006.01)
*B01F 23/237* (2022.01)
*B01F 101/48* (2022.01)

(52) U.S. Cl.
CPC ............ *B01F 35/10* (2022.01); *D06F 35/002* (2013.01); *D06F 39/088* (2013.01); *B01F 23/237611* (2022.01); *B01F 2101/48* (2022.01); *B29C 45/14* (2013.01); *B29K 2101/12* (2013.01); *B29L 2023/22* (2013.01); *D06F 39/08* (2013.01)

(58) Field of Classification Search
CPC ...... B01F 2215/008; B01F 2003/04858; B01F 5/0688; B01F 5/0268; B01F 3/04099; D06F 35/002; D06F 39/08; D06F 39/088; D06F 39/022; B29C 45/14; B29K 2101/12; B29L 2023/22; A47L 15/4217; C02F 1/24
See application file for complete search history.

(56) References Cited

FOREIGN PATENT DOCUMENTS

| | | |
|---|---|---|
| JP | 2009-136864 | 6/2009 |
| JP | 2011-240267 | 12/2011 |
| JP | 2016-7308 | 1/2016 |
| WO | WO 2010/055701 A1 | 5/2010 |
| WO | WO 2013/012069 A1 | 1/2013 |

OTHER PUBLICATIONS

International Search Report dated Oct. 31, 2017 in PCT/JP2017/027875 filed Aug. 1, 2017 (with English Translation).
Japanese Office Action dated Oct. 24, 2017 for corresponding Japanese Application No. 2016-247983.
Chinese Office Action dated Feb. 28, 2019 for corresponding Chinese Application No. 201780009176.5.
Toru Oka, "Plastic Shashutsu Seikei no Kiso (sono 11) (Seikei Kako Gijutsu Hen)", Gino to Gijutsu, Dokuritsu Gyosei Hojin Korei-Shogai-Kyushokusha Koyo Shien Kiko Shokugyo Noryoku Kaihatsu Sogo Daigakko Kiban Seibi Center, May 2003, 7 pages.
Toru Oka, "Plastic Shashutsu Seikei no Kiso (sono 12) (Seikei Kako Gijutsu Hen)", Gino to Gijutsu, Dokuritsu Gyosei Hojin Korei-Shogai-Kyushokusha Koyo Shien Kiko Shokugyo Noryoku Kaihatsu Sogo Daigakko Kiban Seibi Center, Jan. 2004, 7 pages.
Chinese Office Action dated Jun. 30, 2021 in Chinese Patent Application No. 201910966986.0, 6 pages.

* cited by examiner

| RESIN | POM COPOLYMER | PC | ABS | PPS |
|---|---|---|---|---|
| SPECIFIC GRAVITY | 1.41 | 1.2 | 1.05 | 1.34 |
| TENSILE YIELD STRENGTH | 59MPa | 62MPa | 59MPa | 85MPa |
| LINEAR EXPANSION COEFFICIENT | $12 \times 10^{-5}$ | $7 \times 10^{-5}$ | $7 \times 10^{-5}$ | $6.5 \times 10^{-5}$ |
| MOLD SHRINKAGE FACTOR | 2% | 0.5~0.7% | 0.4~0.6% | 1.4~1.9% |

FIG. 10

MINUTE BUBBLE GENERATOR, HOME APPLIANCE PROVIDED WITH MINUTE BUBBLE GENERATOR, AND METHOD OF MANUFACTURING MINUTE BUBBLE GENERATOR

CROSS-REFERENCE TO RELATED APPLICATION(S)

This application is a continuation to an International Application No. PCT/JP2017/027875, filed on Aug. 1, 2017 which is based upon and claims the benefit of priority from Japanese Patent Application No. 2016-247982, filed on, Dec. 21, 2016, the entire contents of which are incorporated herein by reference.

TECHNICAL FIELD

Embodiments disclosed herein relate to a minute bubble generator, a home appliance provided with the minute bubble generator, and a method of manufacturing the minute bubble generator.

BACKGROUND ART

Conventionally, a minute bubble generator is known which is capable of generating minute bubbles by rapidly reducing pressure of liquid passing through a flow path through which liquid such as water passes by locally reducing the cross sectional area of the flow path and thereby precipitating the air dissolved in the liquid. In the conventional minute bubble generator, a small gap was created in the flow path by for example screwing male thread members having sharpened tips into a member forming the flow path and protruding the tips of the male thread members into the flow path.

In such conventional art, the user is forced to assemble a plurality of small male thread members which are difficult to handle with the member forming the flow path. Further in such conventional art, the user is required to make adjustments in the protruding amount of the mail thread members after assembling the male thread members. Thus, the conventional art required considerable time and effort in the assembly and the adjustment of the minute bubble generator and thus, exhibited poor productivity.

PRIOR ART DOCUMENT

Patent Document

Patent Document 1: JP patent application publication 2012-42418

SUMMARY

Problem Solved

Thus, there is provided a minute bubble generator, a home appliance provided with the minute bubble generator, and a method of manufacturing the minute bubble generator which are capable of improving the productivity of the minute bubble generator.

Solution to Problem

The minute bubble generator is provided with a flow path member including a flow path allowing a liquid to pass therethrough; and a colliding part provided in the flow path and generating minute bubbles in the liquid passing through the flow path by locally reducing a cross sectional area of the flow path. The colliding part is formed integrally with the flow path member and is provided closer to an upstream end or a downstream end relative to a lengthwise center of the flow path.

Alternatively, the colliding part is formed as a separate component from the flow path member and is provided in an upstream end side or a downstream end side of the flow path member.

A home appliance of the embodiment is a home appliance using water provided with the minute bubble generator.

A method of manufacturing a minute bubble generator is provided with a flow path member having a flow path allowing a liquid to pass therethrough, and a colliding part provided in the flow path so as to be located at a downstream end of the flow path member and generating minute bubbles in the liquid passing through the flow path by locally reducing a cross sectional area of the flow path. The method of manufacturing the minute bubble generator includes molding a resin by using a mold including a flow path forming part that forms the flow path, a colliding part forming part provided on one end side of the flow path forming part and that forms the colliding part, and a resin injecting part provided on the other end side of the flow path forming part and that injects resin.

BRIEF DESCRIPTION OF THE DRAWINGS

FIG. 10 pertains to the first embodiment and indicates examples of materials constituting the minute bubble generator and their physical properties.

EMBODIMENTS

Embodiments are described hereinafter with reference to the drawings. Elements that are substantially identical across the embodiments are identified with identical reference symbols and are not re-described.

First Embodiment

Figure 1:
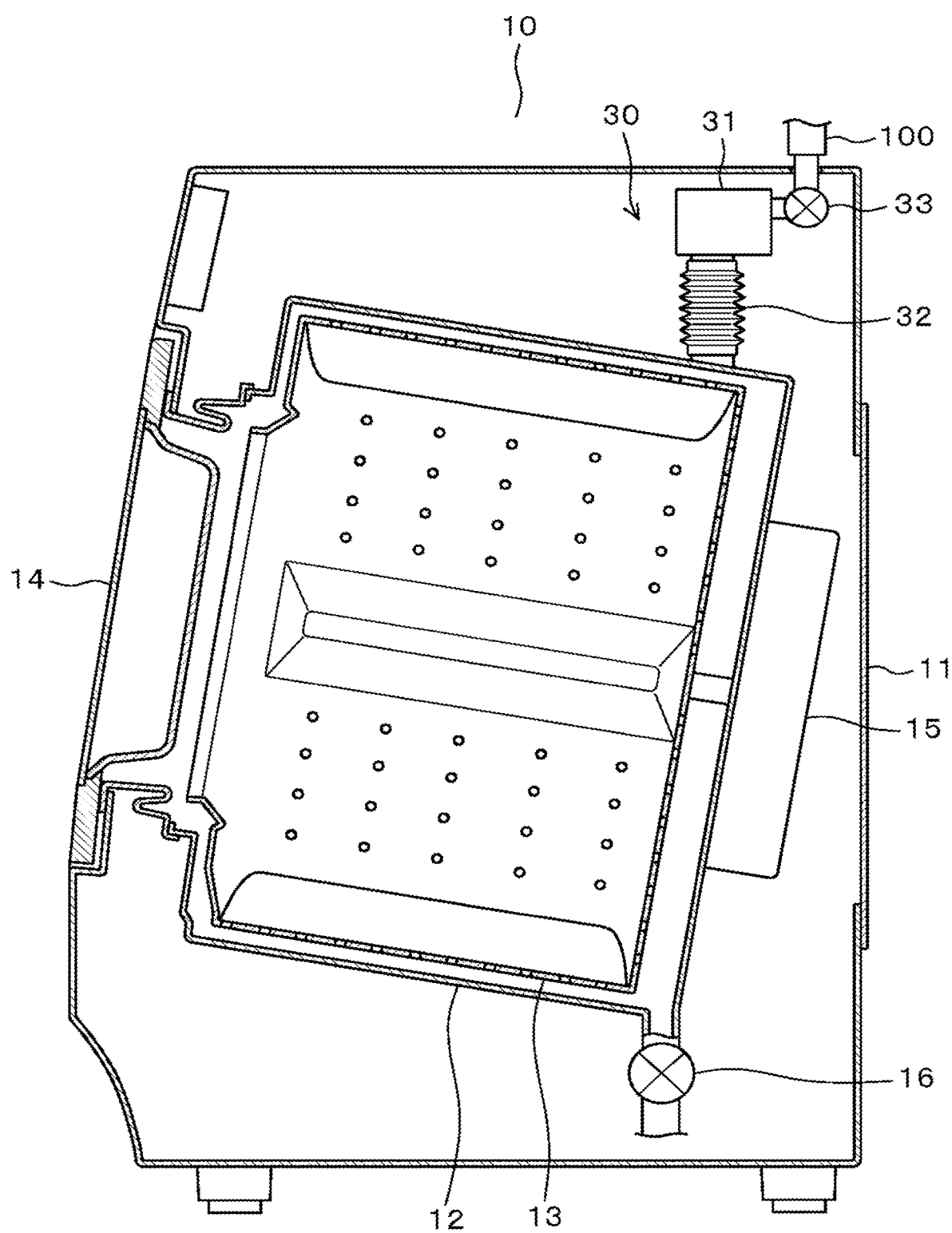
FIG. 1 pertains to a first embodiment and illustrates a drum washing machine which is one example of an object for applying a minute bubble generator.

A first embodiment in which a minute bubble generator is applied to a washing machine is described with reference to FIGS. 1 to 12. A washing machine 10 illustrated in FIG. 1 is provided with an exterior housing 11, a water tub 12, a rotary tub 13, a door 14, a motor 15, and a drain valve 16. The left side of FIG. 1 represents the front side of the washing machine 10 and the right side of FIG. 1 represents the rear side of the washing machine 10. The installation surface side of the washing machine 10, that is, the vertically lower side represents the lower side of the washing machine 10 and the side opposite the installation surface, that is, the vertically upper side represents the upper side of the washing machine 10. The washing machine 10 is the so called lateral axis drum type washing machine in which the rotary axis of the rotary tub 13 is horizontal or rearwardly declined.

Figure 2:
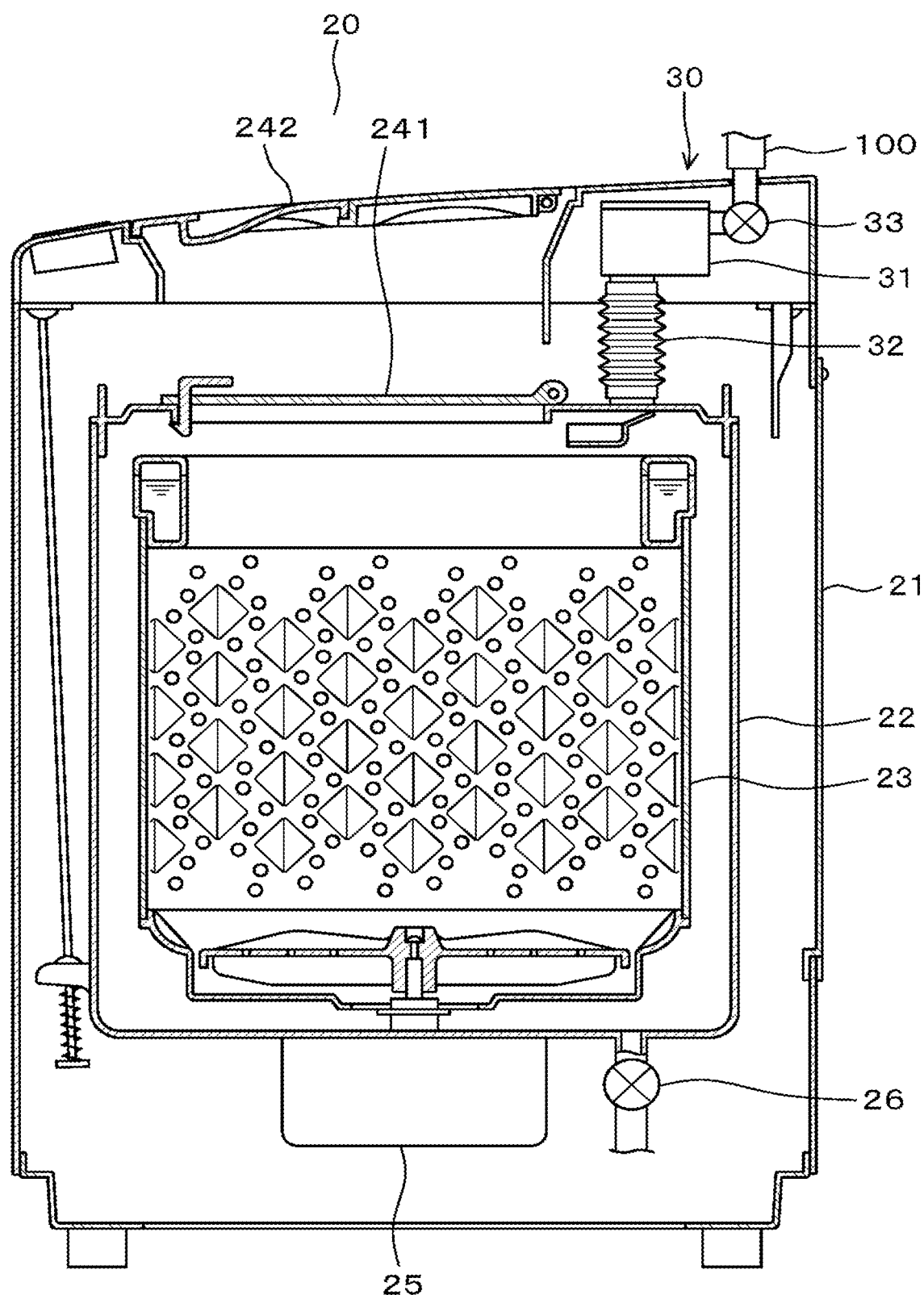
FIG. 2 pertains to the first embodiment and illustrates a vertical axis washing machine which is one example of an object for applying the minute bubble generator.

A washing machine 20 illustrated in FIG. 2 is provided with an exterior housing 21, a water tub 22, a rotary tub 23, an inner lid 241, an outer lid 242, a motor 25, and a drain valve 26. The left side of FIG. 2 represents the front side of the washing machine 20 and the right side of FIG. 2 represents the rear side of the washing machine 20. The installation surface side of the washing machine 20, that is, the vertically lower side represents the lower side of the washing machine 20 and the side opposite the installation surface, that is, the vertically upper side represents the upper side of the washing machine 20. The washing machine 20 is the so called vertical axis washing machine in which the rotary axis of the rotary tub 23 is oriented in the vertical direction.

As illustrated in FIGS. 1 and 2, the washing machines 10 and 20 are each provided with a water feeding device 30. The water feeding device 30 is provided in the upper rear portion of the interior of the exterior housing 11, 21. As illustrated in FIGS. 1 and 2, the water feeding device 30 is connected for example to an external water source such as the faucet of tap water not shown via a water supplying hose 100.

Figure 3:
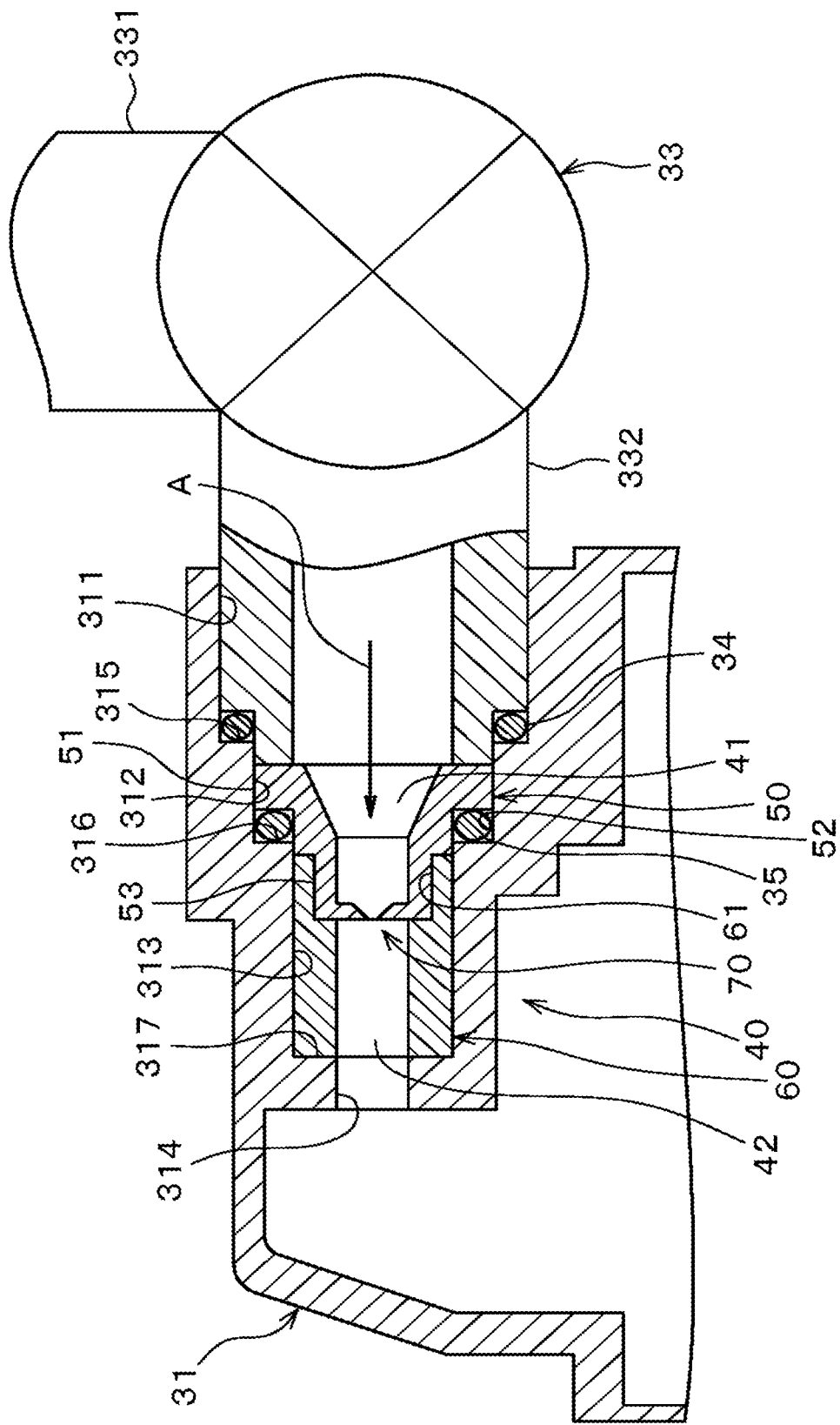
FIG. 3 pertains to the first embodiment and is a partial cross sectional view illustrating the minute bubble generator installed in a water feeding case.

The water feeding device 30 is provided with a water feeding case 31, water feeding hose 32, and an electromagnetic water supplying valve 33 as illustrated in FIGS. 1 and 2. Further, the water feeding device 30 is provided with a first seal member 34, a second seal member 35, and a minute bubble generator 40 as illustrated in FIG. 3. The water feeding case 31 is generally shaped like a container and is configured to be capable of storing detergent, softener and the like therein.

As partially illustrated in FIG. 3, the water feeding case 31 is provided with a first storage part 311, a second storage part 312, a third storage part 313, and a communicating part 314. The first storage part 311, the second storage part 312, the third storage part 313, and the communicating part 314 are provided in the upper portion of the water feeding case 31 for example and are formed by circularly penetrating the water feeding case 31 in the horizontal direction. The interior of the water feeding case 31 communicates with the exterior of the water feeding case 31 through the first storage part 311, the second storage part 312, the third storage part 313, and the communicating part 314.

The first storage part 311, the second storage part 312, and the third storage part 313 are formed in a cylindrical shape for example. The inner diameter becomes smaller in the order of the first storage part 311, the second storage part 312, and the third storage part 313. The communicating part 314 is formed by circularly penetrating the cylindrical bottom of the third storage part 313 at a diameter smaller than the inner diameter of the third storage part 313. A first stepped part 315 is formed at the boundary of the first storage part 311 and the second storage part 312. A second stepped part 316 is formed at the boundary of the second storage part 312 and the third storage part 313. A third stepped part 317 is formed at the boundary of the third storage part 313 and the communicating part 314.

As illustrated in FIGS. 1 and 2, the electromagnetic water supplying valve 33 is provided between the water supplying hose 100 and the water feeding case 31. The water feeding hose 32 connects the water feeding case 31 with the interior of the water tub 12, 22. The electromagnetic water supplying valve 33 opens and closes the flow path between water supplying hose 100 and the water feeding case 31 and the opening and closing of the electromagnetic water supplying valve 33 is controlled by the control signals delivered from the control device not shown of the washing machine 10, 22. When the electromagnetic water supplying valve 33 is opened, water from the external water source is fed into water tub 12, 22 through the electromagnetic water supplying valve 33, the water feeding case 31, and the water feeding hose 32. In doing so, water dissolving the detergent and the softener is fed into the water tub 12, 22 in case the detergent and the softener are stored in the water feeding case 31. Feeding of water into the water tub 12, 22 is stopped when the electromagnetic water supplying valve 33 is closed.

The electromagnetic water supplying valve 33 is provided with an inlet 331 and an outlet 332 as illustrated in FIG. 3. The inlet 331 is connected to the water supplying hose 100 as illustrated in FIG. 1 or 2. The outlet 332 is connected to the water feeding case 31 as illustrated in FIG. 3. The first seal member 34 is an O ring configured by an elastic member such as rubber for example and is provided at the first stepped part 315 located between the inner surface of the first storage part 311 of the water feeding case 31 and the outlet 332. Thus, the outlet 332 of the electromagnetic water supplying valve 33 and the water feeding case 31 are connected to each other in a water tight state.

When a liquid such as water is passed through the minute bubble generator 40 in the direction of arrow A of FIG. 3, the minute bubble generator 40 generates minute bubbles by precipitating gas such as air dissolved in the liquid by rapidly reducing the pressure of the liquid. The minute bubble generator 40 of the present embodiment is capable of generating minute bubbles containing bubbles having a diameter equal to or less than 50 μm. In the example illustrated in FIG. 3, the water discharged from the outlet 332 of the electromagnetic water supplying valve 33 flows through the minute bubble generator 40 from the right side to the left side of FIG. 3. In the minute bubble generator 40 illustrated in FIG. 3, the right side of the page of FIG. 3 assumes the upstream side of the minute bubble generator 40 and the left side of the page of FIG. 3 assumes the downstream side of the minute bubble generator 40.

Figure 4:
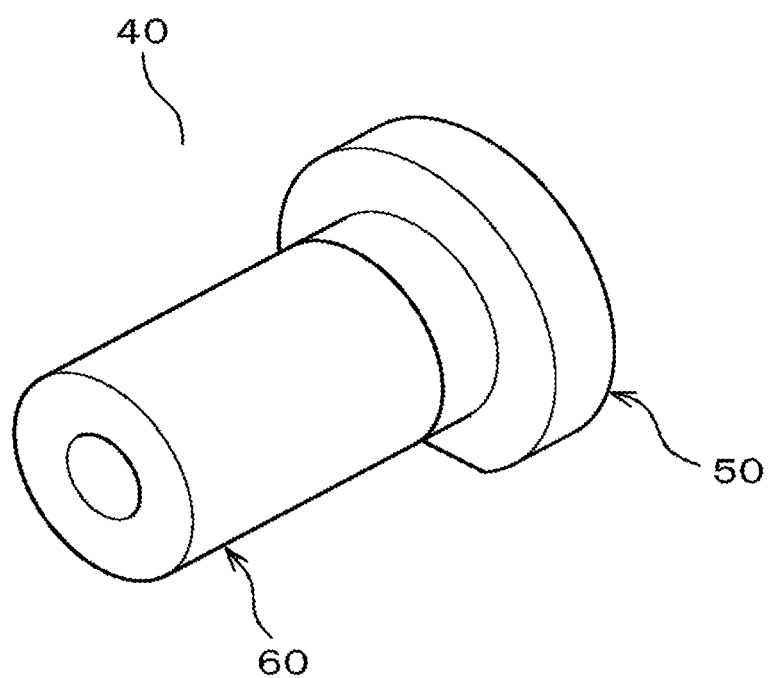
FIG. 4 pertains to the first embodiment and is a perspective view looking at the minute bubble generator from the downstream side.

As illustrated in FIGS. 3 and 4, the minute bubble generator 40 is generally formed in a cylindrical shape provided with a flange. As illustrated in FIG. 3, the minute bubble generator 40 is stored in the inner side of the second storage part 312 and the third storage part 313. The minute bubble generator 40 is made of resin and is provided with flow path members 50 and 60 and a colliding part 70 as also shown in FIG. 3 and FIGS. 5 to 7. The flow path members 50 and 60 are provided with flow paths 41 and 42 respectively through which liquid can pass as illustrated in FIGS. 3 and 7. The flow paths 41 and 42 are mutually connected and form a single continuous flow path.

When the flow paths 41 and 42 are deemed as a single continuous flow path, the colliding part 70 is provided inside the continuous flow paths 41 and 42. The colliding part 70 generates minute bubbles in the liquid passing through the flow paths 41 and 42 by locally reducing the cross sectional area of the flow paths 41 and 42. In the present embodiment, the minute bubble generator 40 is configured by combining flow path members 50 and 60 divided into two separate components. In the following description, of the flow path members 50 and 60, the flow path member 50 in the upstream side is referred to as an upstream flow path member 50 and the flow path member 60 in the downstream side is referred to as a downstream flow path member 60. Of the two flow paths 41 and 42, the flow path 41 in the upstream side is referred to as an upstream flow path 41 and the flow path 42 in the downstream side is referred to as a downstream flow path 42.

Figure 5:
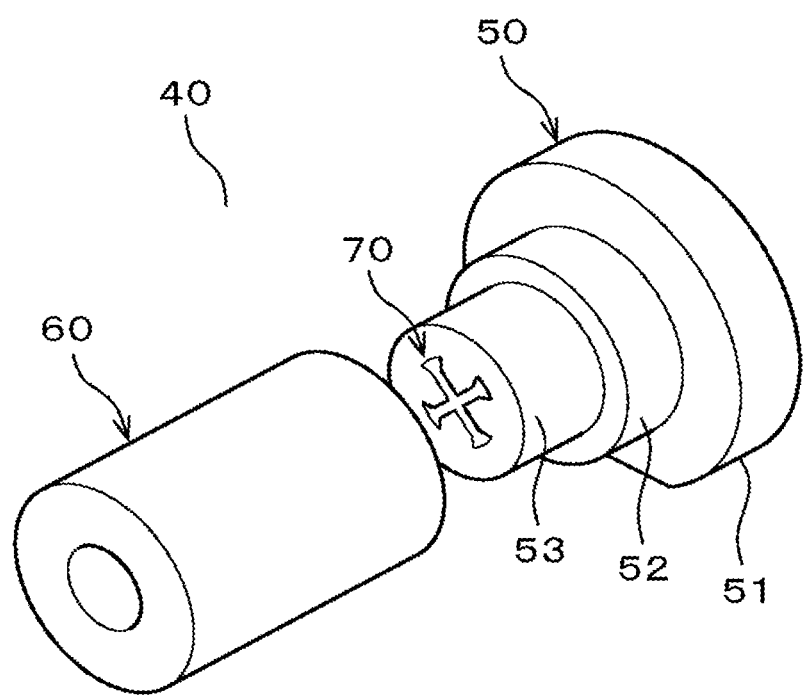
FIG. 5 pertains to the first embodiment and is an exploded perspective view looking at the minute bubble generator from the downstream side.
Figure 6:
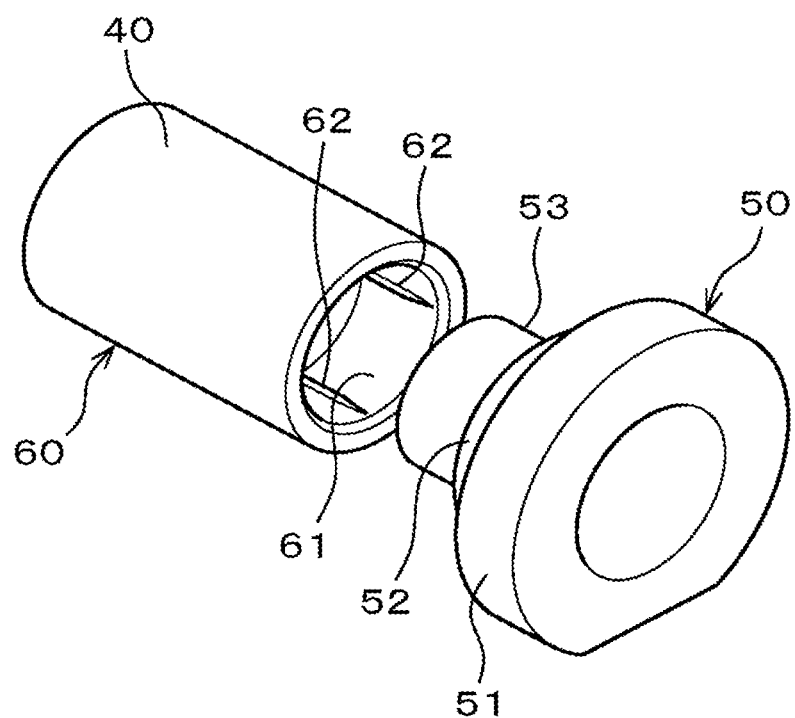
FIG. 6 pertains to the first embodiment and is an exploded perspective view looking at the minute bubble generator from the upstream side.
Figure 7:
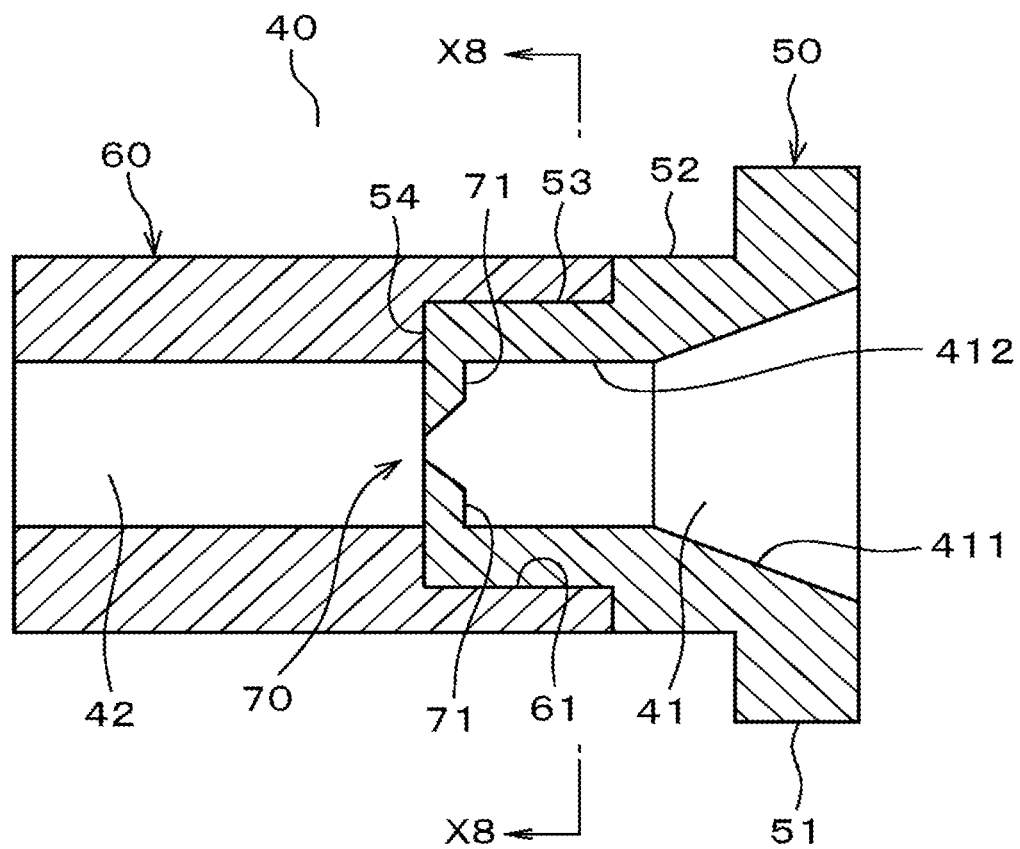
FIG. 7 is a cross sectional view illustrating the minute bubble generator according to the first embodiment.

As illustrated in FIGS. 5 to 7, the upstream flow path member 50 is provided with a flange 51, an intermediate part 52, and an inserting part 53. The flange 51 constitutes the upstream part of the upstream flow path member 50. As illustrated in FIG. 3, the outer diameter dimension of the flange 51 is slightly smaller than the inner diameter dimension of the second storage part 312 of the water feeding case 31 and is greater than the inner diameter dimension of the third storage part 313. Thus, when the minute bubble generator 40 is installed into the water feeding case 31, the flange 51 is locked to the second stepped part 316 via the second seal member 35.

The intermediate part 52 is a part connecting the flange 51 and the inserting part 53. The outer diameter dimension of the intermediate part 52 is smaller than the outer diameter dimension of the flange 51 and is slightly smaller than the inner diameter dimension of the third storage part 313 as illustrated in FIG. 3. The inserting part 53 constitutes the downstream part of the upstream flow path member 50. The outer diameter dimension of the inserting part 53 is smaller than the outer diameter dimension of the intermediate part 52.

The upstream flow path member 50 is provided with the upstream flow path 41 therein as illustrated in FIG. 7. The upstream flow path 41 includes a narrowing part 411 and a straight part 912. The narrowing part 411 is formed in a shape in which the inner diameter is reduced toward the downstream side, that is, toward the colliding part 70 side from the entrance part of the upstream flow path 41. That is, the narrowing part 411 is formed in a conical tapered tube shape in which the cross sectional area, that is, an area through which a liquid can pass of the upstream flow path 41 is continuously and gradually reduced towards the downstream side from the upstream side. The straight part 412 is provided in the downstream side of the narrowing part 411. The straight part 412 is formed in a cylindrical shape or the so called straight tube shape in which the inner diameter does not change, that is, the cross sectional area of the flow path, in other words, the area through which a liquid can pass does not change.

Figure 8:
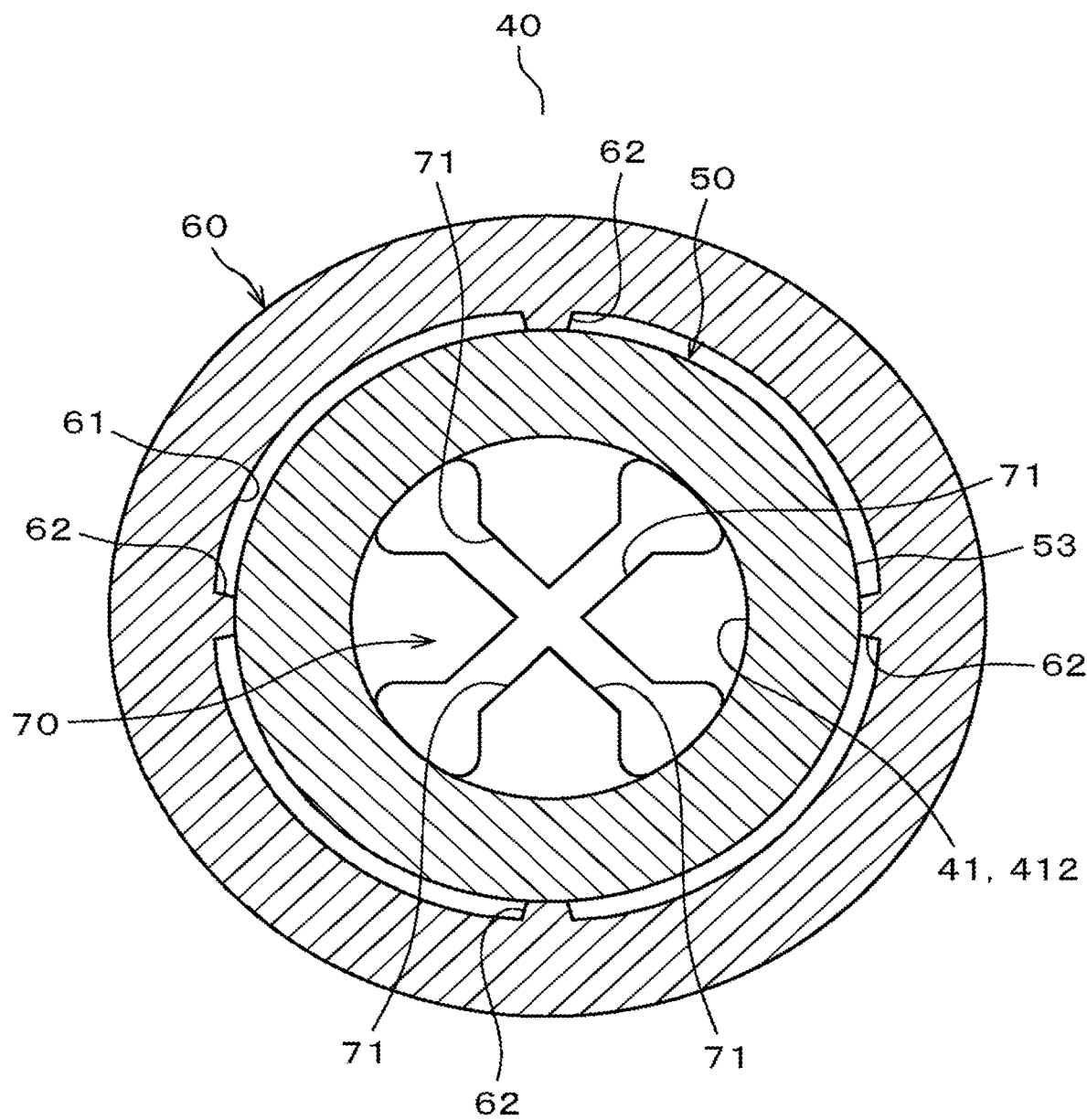
FIG. 8 pertains to the first embodiment and is an enlarged cross sectional view of the minute bubble generator taken along line X8-X8 of FIG. 7.
Figure 9:
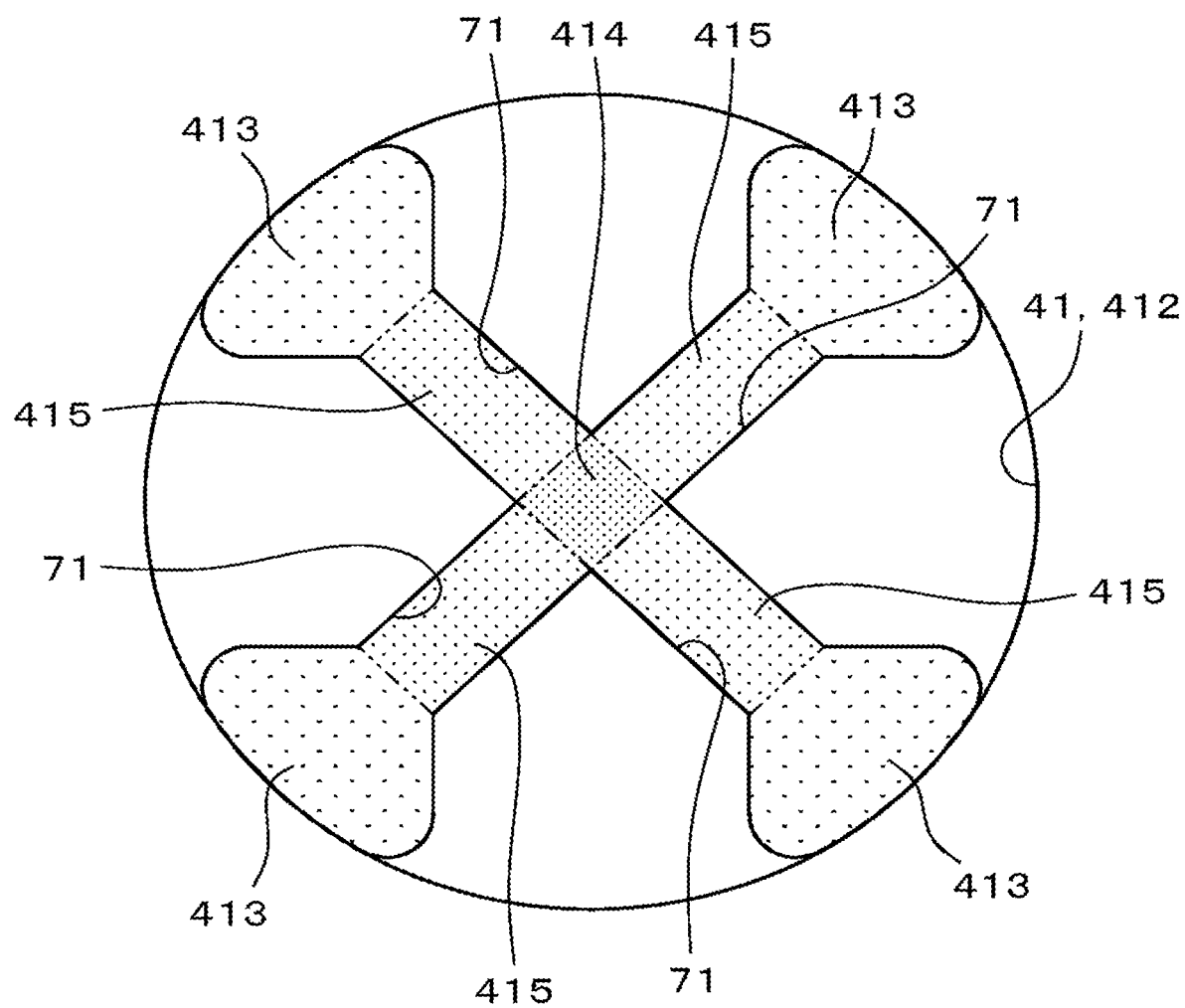
FIG. 9 pertains to the minute bubble generator according to the first embodiment and is an enlarged view based on FIG. 8 with identification of a gap region, a slit region, and a segment region.

The colliding part 70 is formed integrally with the upstream flow path member 50. In this case, the colliding part 70 is provided in the downstream end of the upstream flow path member 50. The colliding part 70 is configured by a plurality of protrusions 71, in this case, four protrusions 71 as illustrated in FIGS. 8 and 9. Each of the protrusions is disposed so as to be spaced from one another at equal intervals taken along the circumferential direction of the cross section of the flow path 41. In the following description, the cross section of the flow path 41 denotes a cross section cut perpendicularly with respect to the flow direction of the liquid flowing through the flow path 41 and the like, that is, the cross section taken along line X8-X8 of FIG. 7. The circumferential direction of the flow path 41 denotes the circumferential direction relative to the center of the cross section of the flow path 41.

Each of the protrusions 71 is formed in a bar shape or a plate shape that protrudes toward the radial center of the flow path 41 from the inner peripheral surface of the upstream flow path member 50. In the present embodiment, each of the protrusions 71 is configured so that the tip is formed in a conical shape which is sharpened toward the radial center of the flow path 41 and the base is formed in a semi-cylindrical bar shape. The protrusions 71 are disposed so that the conical tips face one another with a predetermined spacing therebetween. As shown in FIG. 9, the colliding part 70 forms a segment region 413, a gap region 414, and a slit region 415 in the flow path 41 by the four protrusions 71. That is, the protrusions 71 divide the straight part 412 in the upstream flow path 41 into the segment region 413, the gap region 414, and the slit region 415.

The segment region 413 and the slit region 415 are formed by two protrusions 71 adjacent in the circumferential direction of the upstream flow path 41. In this case, four segment regions 413 are formed in the upstream flow path 41. The segment region 413 contributes in the generation of the minute bubbles but plays a greater role as a path for compensating for the amount of water reduced by the resistance of the gap region 414 and the slit region 415. The areas of the segment regions 413 are equal.

The gap region 414 is a region surrounded by lines joining the tips of two protrusions 71 adjacent in the circumferential direction of the upstream flow path 41. The gap region includes the center of the cross section of the upstream flow path 41. The numbers of the segment regions 413 and the silt regions 415 are equal to the number of protrusions. In the present embodiment, the colliding part 70 is provided with four segment regions 413 and four slit regions 415.

The slit region 415 is a rectangular region formed between two protrusions 71 adjacent in the circumferential direction of the upstream flow path 41. In the present embodiment, the areas of the slit regions 415 are equal. The slit regions 415 communicate with one another through the gap region 414. All of the segment regions 413, the gap region 414, and the slit regions 415 communicate with one another and form a cruciform shape as a whole.

The downstream end of the upstream flow path 41 communicates with the outside of the upstream flow path 41 through the segment regions 413, the gap region 414, and the slit regions 415 formed in the colliding part 70. The downstream end surface of the colliding part 70, that is, the downstream end surface 54 of the upstream flow path member 50 is configured to be flat as a whole as illustrated for example in FIG. 5 and the like.

The downstream flow path member 60 is formed in a cylindrical shape as a whole as illustrated in FIGS. 5 to 7 and is provided with the downstream flow path 42 therein as illustrated in FIG. 7 and the like. The inner diameter dimension of the communicating part 314 is set so as to be equal to or greater than the inner diameter dimension of the downstream flow path 42. In the present embodiment, the inner diameter dimension of the communicating part 314 and the inner diameter dimension of the downstream flow path 42 are equal. Further, as illustrated in FIG. 7, the outer diameter dimension of the downstream flow path member 60 and the outer diameter dimension of the intermediate part 52 are substantially equal. The downstream flow path member 60 is provided with an inserted part 61 and a deforming part 62 therein.

The inserted part 61 is provided inside the downstream flow path member 60 so as to be located in the upstream side of the downstream flow path 42 as illustrated in FIG. 7. The inserted part 61 is formed in a cylindrical shape. As illustrated in FIG. 7 and the like, the inner diameter dimension of the inserted part 61 is slightly greater than the outer diameter dimension of the inserting part 53 of the upstream flow path member 50. Thus, the inserting part 53 of the upstream flow path member 50 is configured to be insertable to the inserted part 61 of the downstream flow path member 60.

As illustrated in FIGS. 6 and 8, the deforming part 62 is provided so as to protrude toward the radial center of the downstream flow path member 60 from the inner surface of the inserted part 61. The deforming part 62 is formed in an elongate bar shape or the so called rib shape which extends along the flow direction of the downstream flow path 42 that is, the longer side direction of the downstream flow path member 60. In the present embodiment, the downstream flow path member 60 is provided with four deforming parts 62. The deforming parts 62 are disposed so as to be equally spaced from one another in the circumferential direction of the inner peripheral surface of the inserted part 61 as illustrated in FIG. 8.

As illustrated in FIG. 7, when the inserting part 53 of the upstream flow path member 50 is inserted into the inserted part 61 of the downstream flow path member 60, the deforming part 62 deforms by being crushed by the outer peripheral surface of the inserting part 53. Thus, the periphery of the inserting part 53 is pressed by the deforming part 62. As a result, the upstream flow path member 50 and the downstream flow path member 60 are connected with the inserting part 53 and the inserted part 61 pressed against one another.

In the present embodiment, the inserted part 61 is formed in a conical tapered tube shape in which the inner diameter dimension is reduced continuously and gradually from the upstream side to the downstream side. That is, the inner diameter dimension of the upstream end of the inserted part 61 is greater than the inner diameter dimension of the downstream end of the inserted part 61 and is greater than the outer diameter dimension of the inserting part 53. The deforming parts 62 are disposed in an inclined state along the inner surfaces of the tapered tube shaped inserted part 61 so that the distance between the deforming parts 62 become smaller from the upstream side to the downstream side.

Because the entrance side of the inserted part 61 that is, the inner diameter dimension of the upstream end is greater than outer diameter dimension of the inserting part 53, the inserting part 53 can be readily inserted into the inserted part 61. When the inserting part 53 is pushed into the inserted part 61, the center of the inserting part 53 is prone to coincide with the center of inserted part 61 since the outer surface of the inserting part 53 moves along the inclined deforming part 62. That is, the radial center of the upstream flow path 41 is prone to coincide with the radial center of the downstream flow path 42. As a result, the insertion of the inserting part 53 to the inserted part 61 is facilitated. A structure similar to the deforming part 62 may be provided on the outer periphery of the inserting part 53 instead of the deforming part 62. As a result, operation and effect similar to those of the deforming part 62 can be obtained.

As illustrated in FIG. 3, the minute bubble generator 40 is installed into the water feeding case 31 with the upstream flow path member 50 and the downstream flow path member 60 mutually connected to be placed in an assembled state by the inserting part 53 of the upstream flow path member 50 being inserted into the inserted part 61 of the downstream flow path member 60. The downstream flow path member 60 of the minute bubble generator 40 is stored in the third storage part 313.

The flange 51 of the upstream flow path member 50 is stored in the second storage part 312. The flange 51 is locked to the second stepped part 316 via the second seal member 35. The second seal member 35 is an O ring configured by an elastic member such as rubber and is provided between the second stepped part 316 and the flange 51. Further, the minute bubble generator 40 is pressed toward the second stepped part 316 side by the tip of the outlet 332 of the electromagnetic water supplying valve 33. Thus, the minute bubble generator 40 and the water feeding case 31 are connected to one another in a water tight state. The flange 51 is locked to the second stepped part 316 via the second seal member 35 and the lower end of the downstream flow path member 60 is locked to the third stepped part. Thus, the minute bubble generator 40 does not fall off toward the inner side of the water feeding case 31 from the second storage part 1 and the third storage part 313 side.

Under this configuration, when the electromagnetic water supplying valve 33 is operated to apply tap water pressure on the upstream end that is, the entrance of the minute bubble generator 40, first, tap water flows from the upstream flow path 41 to the downstream flow path 42. Tap water is a gas dissolving liquid in which air is mainly dissolved as gas. The minute bubble generator 40 primarily generates minute bubbles having a diameter equal to or less than 50 μm in the water passing through the flow paths 41 and 42. The principle of minute bubble generation by the minute bubble generator 40 is considered to be as follows.

The water passing through the minute bubble generator 40 is initially constricted when passing through the narrowing part 411 of the upstream flow path 41 and gradually increases its flow velocity. When the high velocity flow of water collides with the colliding part 70 and passes through the colliding part 70, the pressure of the water is rapidly reduced. The cavitation effect caused by the rapid reduction of pressure generates bubbles in the water.

In the present embodiment, when the water flowing inside the straight part 412 of the upstream flow path 41 collides with the colliding part 70, the water flows along the periphery of the protrusion 71 to flow in the segment region 413, the gap region 414, and the slit region 415. Because the cross sectional areas of the gap region 419 and the slit region 415 are smaller than the segment region 413, the flow velocities of the water passing through the gap region 414 and the slit region 915 are further increased. Thus, the environmental pressure applied to the water passing through the gap region 419 and the slit region 415 becomes close to vacuum and as a result, the air dissolved in the water is placed in a boiling state to precipitate as minute bubbles. As a result, the bubbles generated in the water passing through the colliding part 70 are refined to a diameter equal to or less than 50 µm and the amount of minute bubbles is increased. It is possible to generate large amount of minute bubbles by passing water through the minute bubble generator 40 as described above.

Generally, minute bubbles are categorized as follows depending upon the diameters of the bubbles. For example, minute bubbles having a diameter ranging from several µm to 50 µm are referred to as microbubbles or fine bubbles. Minute bubbles having a diameter equal to or less than several tens of nm are referred to as nanobubbles or ultrafine bubbles. Minute bubbles having a diameter failing between microbubbles and nanobubbles are referred to as micro nanobubbles. Bubbles having a diameter of several tens of nm are smaller than the wavelength of light and thus, are not visible and appear transparent. Such minute bubbles having properties such as large total interfacial area, slow floating speed, and large internal pressure are known to exert excellent cleaning capacity in cleaning objects in a liquid.

For example, bubbles having a diameter equal to or greater than 100 µm elevate rapidly inside the liquid by their buoyancy and disappear by bursting at the liquid surface and thus, stay in the liquid for a relatively short period of time. Minute bubbles having a diameter less than 50 µm on the other hand, stay in the liquid for a long period of time since their buoyancy is small. Further, microbubbles for example contract in the liquid and eventually collapse to become further smaller nanobubbles. High temperature heat and high pressure are locally produced when the microbubbles collapse and thereby destroy foreign materials such as organic substances which float in the liquid or which are attached to objects. High cleaning capacity is exerted in the above described manner.

Further, microbubbles are negatively charged and thus, are prone to adsorb foreign materials floating in the liquid which are positively charged. Thus, foreign materials which are destroyed by the collapsing of the microbubbles are adsorbed to the microbubbles and slowly float to liquid surface. The liquid is cleaned by removing the foreign materials gathering at the liquid surface. High cleaning capacity is thus, exerted.

Pressure of tap water in a general household is approximately 0.1 MPa to 0.4 MPa, however, maximum allowable pressure is set to 1 MPa in a general washing machine. When a water pressure of 1 MPa applied to the minute bubble generator 40, a maximum stress of 10 MPa is applied to the base end portion of the protrusions 71. Further, the performance of the minute bubble generator 40 affects the dimensions of the slit region 415 of the colliding part 70 such as the length dimension, the width dimension, and the gap dimension and thus, the accuracy of the dimensions need to be managed precisely. In order to precisely manage the accuracy of the dimensions, it is preferable to keep the mold shrinkage factor and the thermal shrinkage factor when integrally molding the downstream flow path member 60 and the colliding part 70 to be equal to or less than 3%.

Thus, in the present embodiment, synthetic resin such as POM copolymer (polyacetal copolymer resin), PC (polycarbonate resin), ABS (acrylonitrile butadiene styrene resin), and PPS (poly phenylene sulfide resin) shown in FIG. 10 for example are used as the materials for the minute bubble generator 40. The materials shown in FIG. 10 all have outstanding water resistance, impact resistance, wear resistance, and chemical resistance, have a tensile yield strength equal to or greater than 18 MPa, and have a mold shrinkage factor and a thermal shrinkage factor equal to or less than 3%. The minute bubble generator 40 is not limited to the above described resin materials but may be configured by various rigid resin materials. Further, the upstream flow path member 50 and the downstream flow path member 60 may be configured by different materials.

Next, a description will be given on a method of manufacturing the upstream flow path member 50 including the colliding part 70. In the present embodiment, the upstream flow path member 50 and the downstream flow path member 60 are both manufactured by, for example, injection molding a resin material. However, the manufacturing method of the downstream flow path member 60 will not be described in detail.

Figure 11:
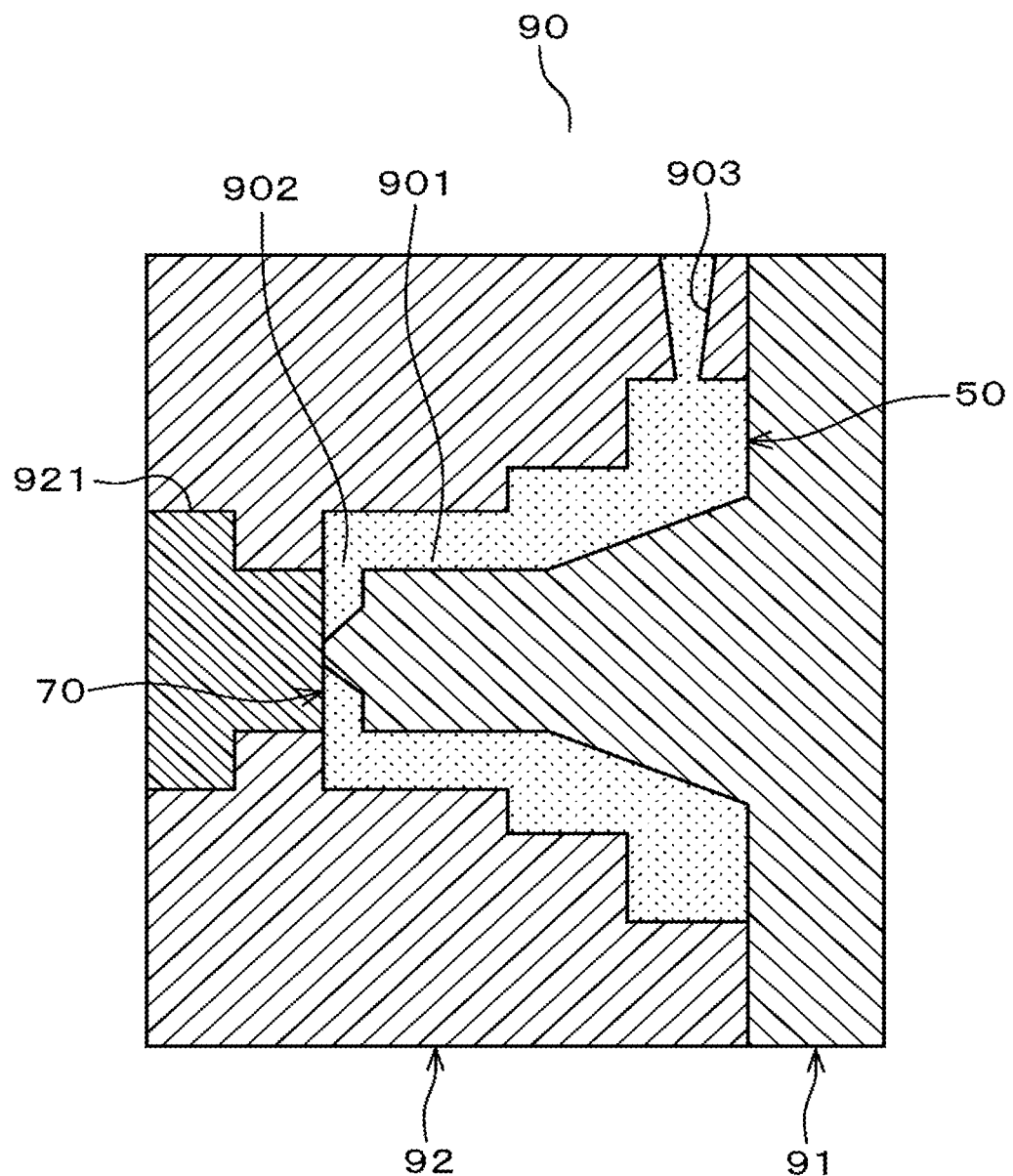
FIG. 11 pertains to the first embodiment and is a cross sectional view illustrating one example of a mold for manufacturing the minute bubble generator.
Figure 12:
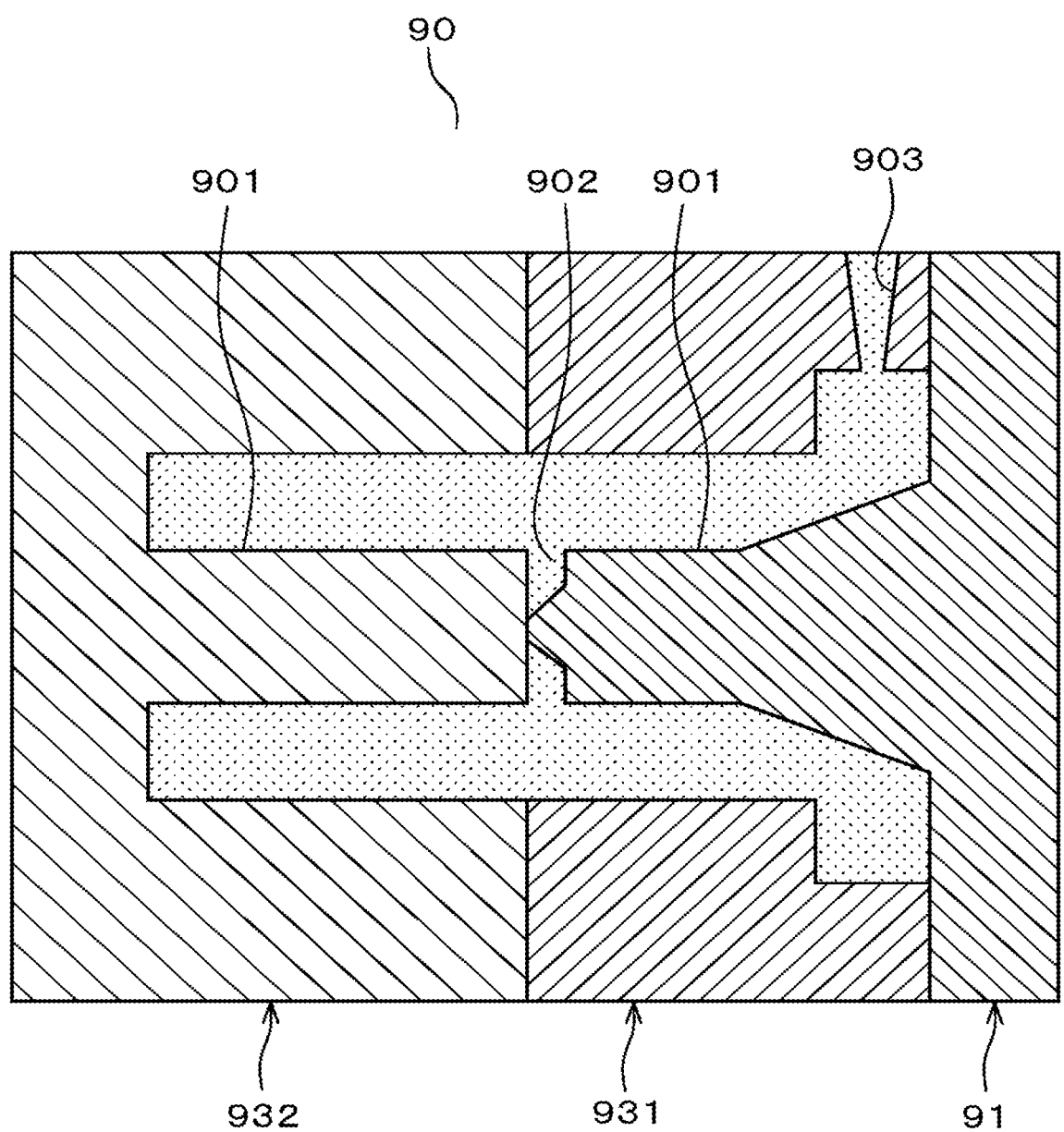
FIG. 12 pertains to a comparative embodiment and is a cross sectional view illustrating one example of a mold for manufacturing the minute bubble generator.

The upstream flow path member 50 is molded integrally with the colliding part 70 by, for example, injection molding a resin material. As shown in FIG. 11, a mold 90 is used in the manufacturing of the upstream flow path member 50. The mold 90 includes a flow path forming part 901, a colliding part forming part 902, and a resin injecting part 903. The flow path forming part 901 is a part for forming a space serving as the upstream flow path 41. The colliding part forming part 902 is a part for forming the colliding part 70 and is provided on one end side of the flow path forming part 901, in this case, on the downstream tip. The resin injecting part 903 is a gate for injecting a heat-melted resin into the mold 90.

The mold 90 is provided with a convex mold 91 and a concave mold 92. The flow path forming part 901 and the colliding part forming part 902 are formed between the convex mold 91 and the concave mold 92 by inserting the convex mold 91 into the concave mold 92. The resin injecting part 903 is provided, for example, at the concave mold 92 so as to be located on the other end side of the flow path forming part 901, that is, on the opposite side of the colliding part 70. That is, the resin injecting part 903 is provided at a position distant as possible from the colliding part forming part 902, in this case, at a portion corresponding to the flange 51 of the upstream flow path member 50. The resin injecting part 903 may be provided at the convex mold 91.

The concave mold 92 is provided with the resin injecting part 903 and an insert 921. The insert 921 is built in to the concave mold 92 and is provided on the opposite side of the resin injecting part 903, that is, on the colliding part forming part 902 side. In the present embodiment, the insert 921 is provided at the concave mold 92 so as to be located near the colliding part forming part 902.

In this configuration, the heat-melted resin is injected into the mold 90 from the resin injecting part 903. The resin injected into the mold 90 from the resin injecting part 903 moves to the colliding part forming part 902 side from the flow path forming part 901 to fill the mold 90. The volume of the space forming the flow path forming part 901 is greater than the volume of the space forming the colliding part forming part 902. Thus, when the resin injecting part 903 for example is provided near the colliding part forming part 902, the resin injected into the mold 90 from the resin injecting part 903 gets stuck at the colliding part forming part 902 having a small volume and it becomes difficult for the resin to spread throughout the entirety of the mold 90 to thereby cause short shots. As a result, molding failures such as voids are prone to occur in the completed upstream flow path member 50.

In the present embodiment on the other hand, the resin injecting part 903 is provided on the opposite side of the colliding part 70 that is, at a location as distant as possible from the colliding part 70. In this case, the resin injecting part 903 is connected to a space larger than the colliding part forming part 902. As a result, the resin injected into the flow path forming part 901 from the resin injecting part 903 is allowed to spread evenly to the colliding part forming part 902 without getting stuck at the flow path forming part 901 and suppress occurrence of short shots. It is thus, possible to prevent occurrence of molding failures such as voids by the injected resin getting stuck and hardening midway through.

Further, gas is generated from the resin injected into the mold 90. The gas generated inside the mold 90 from the resin and residual air accumulated in the mold 90 are pushed in the direction in which the resin flows that is, toward the colliding part forming part 902 by the resin being injected from the resin injecting part 903. As a result, the pressure in the vicinity of the colliding part forming part 902 is increased to make it difficult for the resin to spread throughout the entirety of the mold 90. Because the volume of the colliding part forming part 902 is smaller compared to the flow path forming part 901, it is difficult for the resin to reach the colliding part forming part 902 and short shots are prone to occur. As a result, molding failures such as voids are prone to occur in the completed upstream flow path member 50.

In the present embodiment on the other hand, the mold 90 is provided with the insert 921 in the colliding part forming part 902 side. As a result, gas and residual air pushed toward the colliding part forming part 902 side by the resin injected from the resin injecting part 903 are released outside the mold 90 from the gaps in the outer surface of the insert 921. It is thus, possible to prevent elevation of pressure near the colliding part forming part 902 and cause the resin to easily reach the colliding part forming part 902 as well which is smaller in volume compared to the flow path forming part 901. Hence, it is possible to suppress occurrence of short shots and consequently prevent occurrence of molding failures such as voids in the completed upstream flow path member 50.

According to the embodiment described above, the minute bubble generator 40 is provided with the flow path members 50 and 60 and the colliding part 70. The flow path members 50 and 60 are provided with flow paths 41 and 42 allowing liquid to pass therethrough. The colliding part 70 is provided in either of the flow paths 41 and 42, in this case, in the upstream flow path 41 and generates minute bubbles in the liquid passing through the flow path 41 by locally reducing the cross sectional area of the flow path 41. The colliding part 70 is formed integrally with either of the flow path members 50 and 60, in this case, with the upstream flow path member 50.

Because the upstream flow path member 50 and the colliding part 70 are formed integrally, it is possible to reduce the number of parts of the minute bubble generator 40 and unnecessitate the assembling of the colliding part 70 which is a small part to the upstream flow path member 50. Unlike the case in which the colliding part 70 is configured by a male thread, subtle adjustments after assembly is not required. Further, because the colliding part 70 is formed integrally with the upstream flow path member 50 and thus, is unmovable with respect to the upstream flow path member 50, it is further possible to prevent the gap region 414 from changing by chronological change. As a result, it is possible to reduce the task of assembly and adjustments thereby making the minute bubble generator 40 easy to handle and allow stable performance of the minute bubble generator 40 to be maintained over long period of time.

At this time, a case is considered in which the colliding part 70 is provided near the middle of the longer side direction of the flow path member 50 that is, near the middle of the flow direction of the flowpath 41. In such case, in order to integrally form the flow path member 50 and the colliding part 70, the mold 90 needs to be divided in two or more, in this case, divided in three into the convex mold 91 and two concave molds 931 and 932 as illustrated in the example indicated in FIG. 12 for example and thereby complicates the structure of the mold 90. Further, in the configuration of FIG. 12, it becomes difficult to secure an escape way of gas near the colliding part forming part 902 since the colliding part forming part 902 is located in the central portion of the mold 90. Thus, in the configuration of FIG. 12, it becomes difficult for the resin to reach the inside of the colliding part forming part 902 and as a result, molding failures such as short shots become easy to occur near the colliding part forming part 902.

Further, in order to exert the performance of the minute bubble generator 40, it is required to precisely manage the dimensions of regions 413, 414, and 415 of the colliding part 70. Thus, it is required to manage molding failures such as short shots described above and burrs the like resulting from wear or the like of the mold 90. However, when the colliding part 70 is provided near the middle of the longer side direction of the flow path member 50, it is difficult to visually recognize the molding failures from the exterior even when the molding failures occur near the colliding part 70, that is, near the inner central portion of the minute bubble generator 40. Thus, it takes time and effort in confirming the presence and absence of a molding failure.

In the present embodiment on the other hand, the colliding part 70 is provided closer to the upstream end or the downstream end relative to the center of the flow path 41 in the lengthwise direction, in this case, closer to the upstream end. As a result, it is possible to relatively simplify the structure of the mold 90 for integrally molding the upstream flow path member 50 and the colliding part 70 as illustrated in FIG. 11. Further, as described above, it becomes easier for the resin to reach the inside of the colliding part forming part 902 and allow molding failures such as voids to be suppressed.

Further, since the colliding part 70 is provided closer to the upstream end or the downstream end relative to the center of the lengthwise direction of the flow path 41, it is easy to visually recognize molding failures from the exterior when molding failures such as short shots and burrs or the like occur near the colliding part 70. Thus, it is possible to reduce the time and effort for confirming the presence and absence of molding failures. As a result, it is possible to improve the productivity of the minute bubble generator 40.

When the liquid is released to the water feeding case 31 immediately after passing through the colliding part 70, the flow velocity of water flowing into the colliding part 70 is reduced because the flow velocity of water immediately after passing through the colliding part 70 is reduced and as a result, the number of minute bubbles generated at the minute bubble generator 40 is presumed to be reduced. Thus, it is preferable to provide a flow path of a predetermined distance having an inner diameter substantially equal to the flow path in the upstream side of the colliding part 70, that is, the upstream flow path 41 in the downstream side of the colliding part 70 as well. As a result, it is possible to suppress the reduction flow velocity of the liquid flowing into the colliding part 70 because the flow velocity of the liquid immediately after passing through the colliding part 75 can be made relatively fast. However, when a flow path is provided also in the downstream side of the colliding part 70, the mold becomes complex and it becomes difficult for the injected resin to spread throughout the entirety of the mold as described with reference to FIG. 12 to thereby reduce the manufacturing efficiency of the minute bubble generator 40 and increase the manufacturing cost.

Thus, in the present embodiment, the minute bubble generator 40 is provided with the upstream flow path member 50 and the downstream flow path member 60 as the flow path member. Of the flow paths 41 and 42, the upstream flow path member 50 is provided with the upstream flow path 41 which is a flow path in the upstream side of the colliding part 70. The downstream flow path member 60 is configured as a separate component from the upstream flow path member 50. Of the flow paths 41 and 42, the downstream flow path member 60 is provided with the downstream flow path 42 which is a flow path in the downstream side of the colliding part 70.

That is, the minute bubble generator 40 is configured by combining two flow path members 50 and 60 which are configured as separate components. In other words, the colliding part 70 is provided between the upstream flow path 41 and the downstream flow path 42. Stated differently, when the upstream flow path 41 and the downstream flow path 42 are deemed as a single continuous flow path, the colliding part 70 is provided in the intermediate portion of the flow path, in this case, the middle portion of the flow path.

Thus, when integrally molding the colliding part 70 with the upstream flow path member 50, the colliding part 70 is located at the end of the upstream flow path member 50. Hence, the structure of the mold 90 can be relatively simplified while allowing the resin to easily reach the interior of the colliding part forming port 902 and suppress molding failures such as voids. On the other hand, when the minute bubble generator 40 is configured by assembling the upstream flow path member 50 and the downstream flow path member 60, the downstream flow path 42 is provided in the downstream side of the colliding part 70 as well. Thus, the minute bubble generation efficiency by the minute bubble generator 40 can be increased as much as possible since the flow velocity of the liquid immediately after passing through the colliding part 70 can be made relatively fast. As a result, it is possible to achieve both improvement in the productivity of the minute bubble generator 40 and in the generation efficiency of the minute bubbles.

The inner diameter dimension of the downstream flow path 42 is set so as to be equal to or less than the inner diameter dimension of the upstream flow path 41. Thus, it is possible to more effectively suppress the reduction of the flow velocity of water passed through the colliding part 70. As a result, it is possible to improve the efficiency of minute bubble generation by the minute bubble generator 40 even more effectively.

The minute bubble generator 40 is provided with the inserting part 53, the inserted part 61, and the deforming part 62. The inserting part 53 is provided to either of the upstream flow path member 50 and downstream flow path member 60. The inserted part 61 is provided to the remaining other of the upstream flow path member 50 and the downstream flow path member 60. The inserting part 53 is capable of being inserted into the inserted part 61. The deforming part 62 is provided to either of the inserting part 53 and the inserted part 61.

In the present embodiment, the inserting part 53 is provided to the upstream flow path member 50. The inserted part 61 is provided to the downstream flow path member 60. The deforming part 62 is provided to the inserted part 61 of the downstream flow path member 60. The deforming part 62 connects the inserting part 53 and the inserted part 61 in a pressed state by being crushed when the inserting part 53 is inserted to the inserted part 61. That is, the upstream flow path member 50 and the downstream flow path member 60 are connected by press fitting the inserting part 53 into the inserted part 61.

Thus, the user is allowed to assemble the minute bubble generator 40 by mutually connecting the upstream flow path member 50 and the downstream flow path ember 60 by merely press fitting the inserting part into the inserted part 61 without using a fastening member such as a screw, that is, without using tools such as a driver. Hence, tools the like or skilled technique is not required to connect the upstream flow path member 50 and the downstream flow path member 60. It is thus, possible to suppress the reduction of productivity of the minute bubble generator 40 caused by configuring the upstream flow path member 50 and the downstream flow path member 60 by two separate components.

The colliding part 70 is provided at the downstream end of the upstream flow path member 50. The end surface 54 in the downstream side of the upstream flow path member 50 where the colliding part 70 is provided is flat. Because no other structure besides the colliding part 70 is provided on the downstream end surface of the upstream flow path member 50, it is possible to make the structure of the downstream end surface 54 of the upstream flow path member 50 of the mold 90 to be relatively simple. It is thus, possible to allow the resin to easily reach the colliding part forming part 902 without being blocked by other structures to thereby reduce manufacturing failures and further improve the productivity of the minute bubble generator 40.

A case is considered in which the minute bubble generator 40 is not provided with the narrowing part 411 for example and the outlet 332 of the electromagnetic water supplying valve 33 is connected directly to the straight part 412 of the upstream flow path 41. In this case, the inner diameter dimension of the outlet 332 is greater than the inner diameter dimension of the straight part 412 and thus, a step is formed between the outlet 332 and the straight part 412. Thus, some of the water discharged from the outlet 332 collides with the step between the outlet 332 and the straight part 412 to reduce flow velocity of water flowing into the straight part 412. Hence, the flow velocity of the water passing through the minute bubble generator 40 is reduced and as a result, the size of the minute bubbles generated by the minute bubble generator 40 is deteriorated and the number of minute bubbles generated is reduced.

In the present embodiment on the other hand, the minute bubble generator 40 is further provided with the narrowing part 411. The narrowing part 411 is provided in the upstream side of the colliding part 70 and is formed in a tapered shape in which the inner diameter is reduced from the upstream side to the downstream side. Thus, the flow velocity of the water discharged from the outlet 332 is gradually increased by being gradually constricted when passing through the narrowing part 411. That is, substantially all of the tap water discharged from the outlet 332 passes through the straight part 412 without lowering the speed but increasing the speed to the contrary. Thus, it is possible to increase the flow velocity of water passing through the colliding part 70 and improve the size and the number of the minute bubbles formed by the minute bubble generator 40 to further improve the efficiency of the generation of minute bubbles.

Further in the present embodiment, the manufacturing method of the minute bubble generator 40 obtains the upstream flow path member 50 integrated with the colliding part 70 by molding the resin using the mold 90 illustrated in FIG. 11. The mold 90 includes the flow path forming part 901 and the colliding part forming part 902. Of the flow paths 41 and 42, the flow path forming part 901 forms the upstream flow path 41. The colliding part forming part 902 is provided on one end side of the flow path forming part 901, in this case, the downstream end side and is a part for forming the colliding part 70. The resin injecting part 903 is provided on the other end side of the flow path forming part 901, in this case, the upstream end side and is a part for injecting the resin.

That is, the resin injecting part 903 is provided in a position distanced as much as possible from the colliding part 70. Thus, the resin injected into the flow path forming part 901 from the resin injecting part 903 spreads evenly to reach the colliding part forming part 902 without being stuck in the flow path forming part 901. Hence, it is possible to prevent occurrence of molding failures such as voids by the injected resin getting stuck and hardening midway through.

Further, the mold 90 is provided with the insert 921. The insert 921 constitutes a part of the concave mold 92 and is provided in the colliding part forming part 902 side of the lengthwise direction of the flow path forming part 901. Thus, gas and residual air pushed toward the colliding part forming part 902 side by the resin injected from the resin injecting part 903 can be let out of the mold 90 from the gap in the outer surface of the insert 921. Hence, it is possible to suppress pressure elevation in the vicinity of the colliding part forming part 902 and allow the resin to easily reach the colliding part forming part 902 which is smaller in volume compared to the flow path forming part 901. As a result, it is possible to prevent occurrence of molding failures such as voids in the completed downstream flour path member 60.

Further, the colliding part 70 is provided with a plurality of, in this case, four protrusions 71. Each of the protrusions 71 protrudes toward the inner side of the upstream flow path 41 from the inner peripheral surface of the upstream flow path member 50 and the tip of each of the protrusions 71 is sharpened into a conical shape. Further, a gap region 414 is formed at the colliding part 70. The gap region 414 is a region formed between the tips of the plurality of, in this case, four protrusions 71.

Thus, the water flowing through the upstream flow path 41 is further depressurized by passing through the gap region 414 and therefore allows the cavitation effect to be improved even more effectively. As a result, it is possible to further miniaturize the bubbles formed in the liquid and increase the amount of minute bubbles.

Further, the slit regions 415 are formed at the colliding part 70. The slit region 415 is formed between two adjacent protrusions 71 of the plurality of protrusions 71. Hence, the water passing through the colliding part 70 is depressurized by passing through the slit regions 415 as well and thus, it is possible to improve the cavitation effect. As a result, it is possible to miniaturize the bubbles precipitated in the liquid and increase the amount of minute bubbles in this portion as well.

Other than the above described washing machines 10 and 20, the minute bubble generator 40 may be applied to home appliances such as dish washers and warm water toilet seats that perform cleaning by using tap water. By applying the minute bubble generator 40 to the home appliances using tap water, it is possible to add cleaning effect by the minute bubbles to the tap water used for cleaning. As a result, it is possible to improve the value added to the home appliance.

Figure 13:
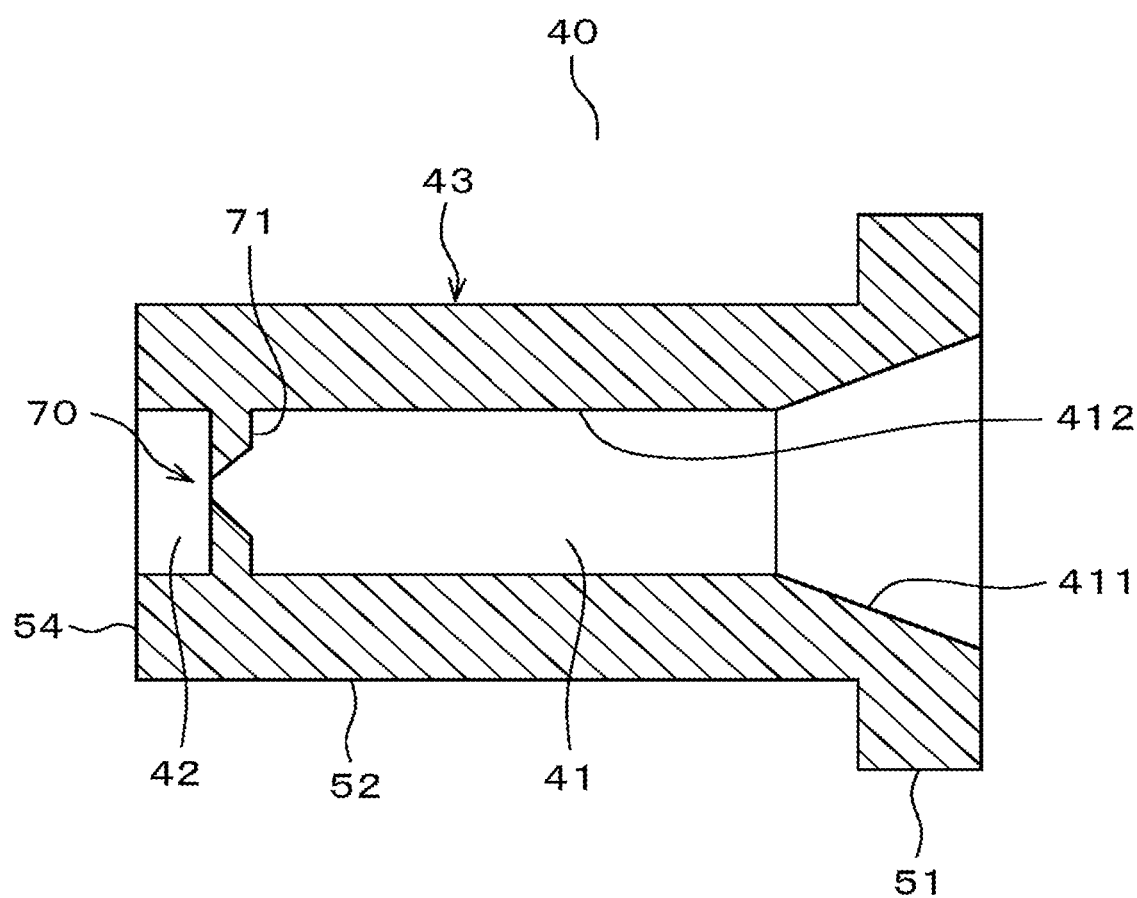
FIG. 13 is a cross sectional view of the minute bubble generator according to another example.

The minute bubble generator 40 need not be configured by two flow path members 50 and 60. For example, as shown in FIG. 13, the minute bubble generator 40 may be configured by a single flow path member 43. In such case, considering the ease of manufacture, the colliding part 70 is preferably provided at the upstream end or the downstream end of the flow path member 43. For example, the manufacturability of the minute bubble generator 40 is improved compared to the case in which the colliding part 70 is provided in the center of the longer side direction of the flow path member 43 as long as the colliding part 70 is provided closer to the upstream end or the downstream end from the center of the longer side direction of the flow path member 43 as shown in FIG. 13 even if the colliding part 70 is not provided at the end of the flow path member 43.

Further, in the above described embodiment, the colliding part 70 was provided at the downstream end of the upstream flow path member 50 but is not limited to such configuration. For example, the colliding part 70 may be provided at the upstream end of the upstream flow path member 50, the upstream end of the downstream flow path member 60, or the downstream end of the downstream flow path member 60.

The connection of the upstream flow path member 50 and the downstream flow path member 60 is not limited to the method in which the insert part 53 is press fitted into the inserted part 61. For example, threading parts engaging with one another may be provided at the insert part 53 and the inserted part 61 and the upstream flow path member 50 and the downstream flow path member 60 may be connected by threading the insert part 53 into the inserted part 61. The connection may be further established by bonding or welding.

Second Embodiment

Figure 14:
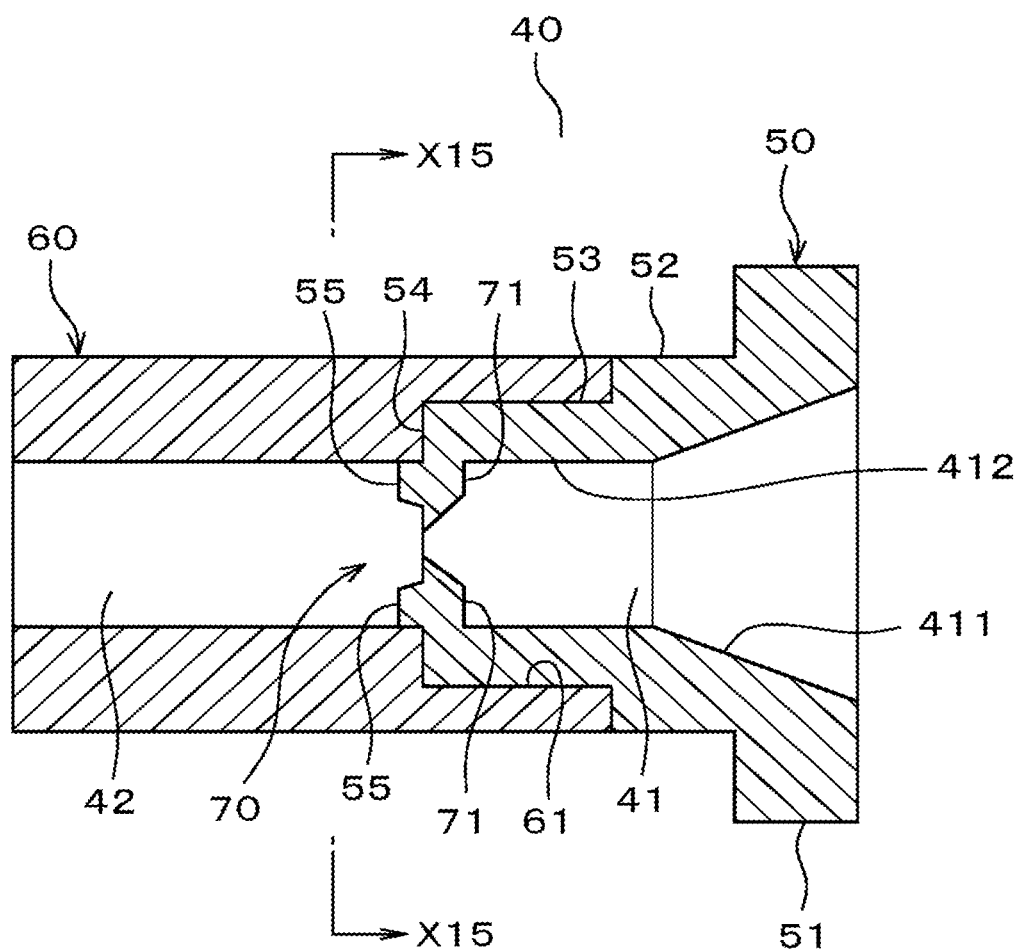
FIG. 14 is a cross sectional view of the minute bubble generator according to a second embodiment.
Figure 15:
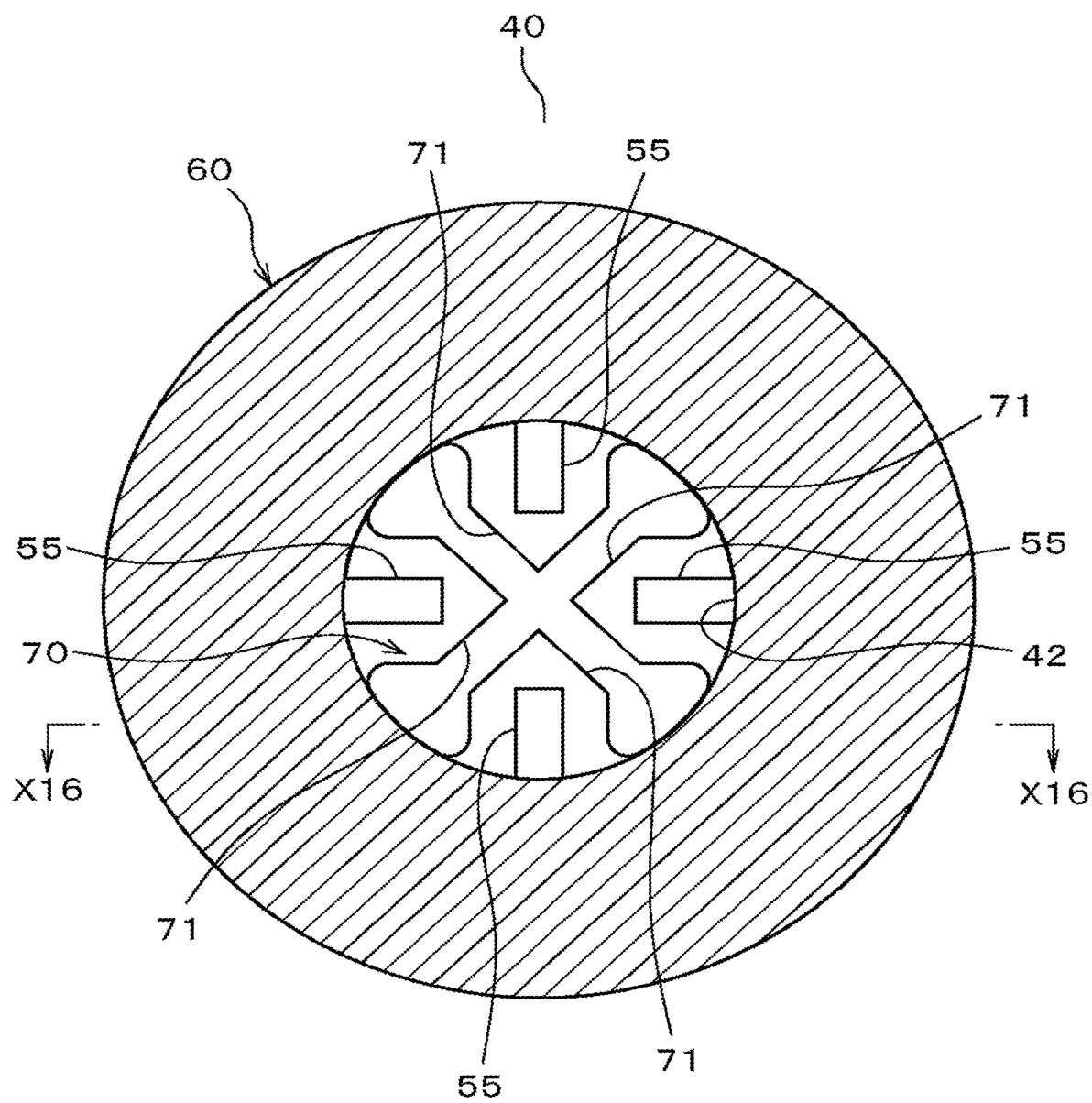
FIG. 15 pertains to the second embodiment and is an enlarged cross sectional view of the minute bubble generator taken along line X15-X15 of FIG. 14.
Figure 16:
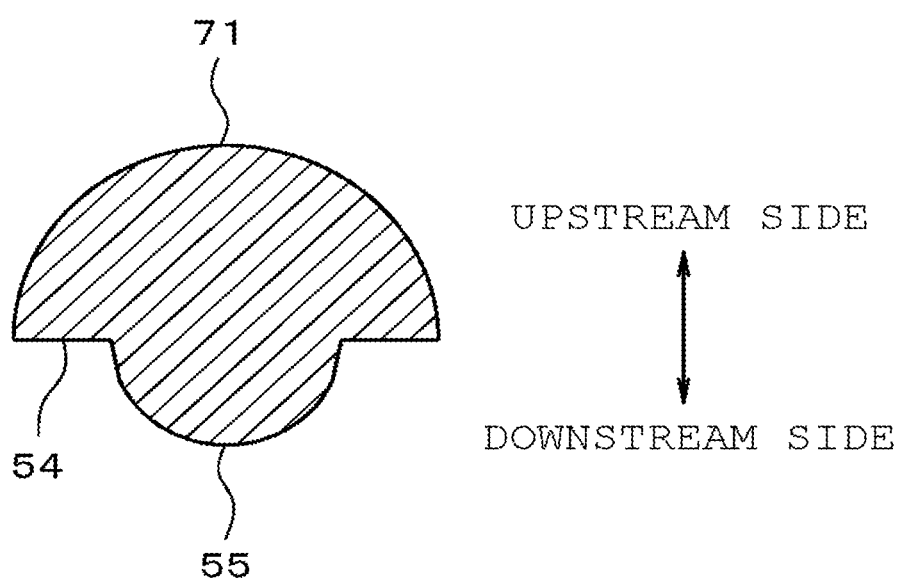
FIG. 16 pertains to the second embodiment and is an enlarged cross sectional view of protrusions of the minute bubble generator taken along line X16-X16 of FIG. 15.

Next, a description will be given on a second embodiment with reference to FIG. 14 to 16.

In the second embodiment, the upstream flow path member 50 is further provided with a projection 55 in addition to the structures of the first embodiment. The projection 55 is provided integrally with the colliding part 70, that is, provided integrally with the upstream flow path member 50. As illustrated in FIG. 14, the projection 55 is provided so as to contact the downstream surface of the colliding part 70, that is, the downstream end surface 54 of the upstream flow path member 50. The projection 55 is provided so as to project toward the downstream side of the upstream flow path 41 that is, toward the downstream flow path 42 side from the end surface 54. That is, the projection 55 is located inside the downstream flow path 42.

The projection 55 is provided so as to correspond to each of the protrusions 71 of the colliding part 70. That is, as shown in FIG. 15, the upstream flow path member 50 of the present embodiment is provided with four projections 55 with respect to the four protrusions 71. As shown in FIG. 16, each of the projections 55 is formed to have a semicircular cross section for example. The cross section of the projections 55 is not limited to a semicircular shape but may be rectangular, triangular, etc. or a combination thereof. The periphery of the projections 55 is formed so as to be flat by the end surface 54. That is, in the present embodiment, the upstream flow path member 50 is provided with a flat region in the periphery of the projections 55 at the end surface 54 in the downstream side.

According to such configuration, the water passed through the colliding part 70 generates turbulence so as to engulf the edge of the colliding part 70, however, the presence of the projection 55 relaxes the turbulence, that is, rectifies the turbulence. It is thus, possible to suppress the reduction of the flow velocity of water flowing through the downstream flow path 42 and as a result, further improve the efficiency of generation of minute bubbles by the minute bubble generator 40.

Third Embodiment

Figure 17:
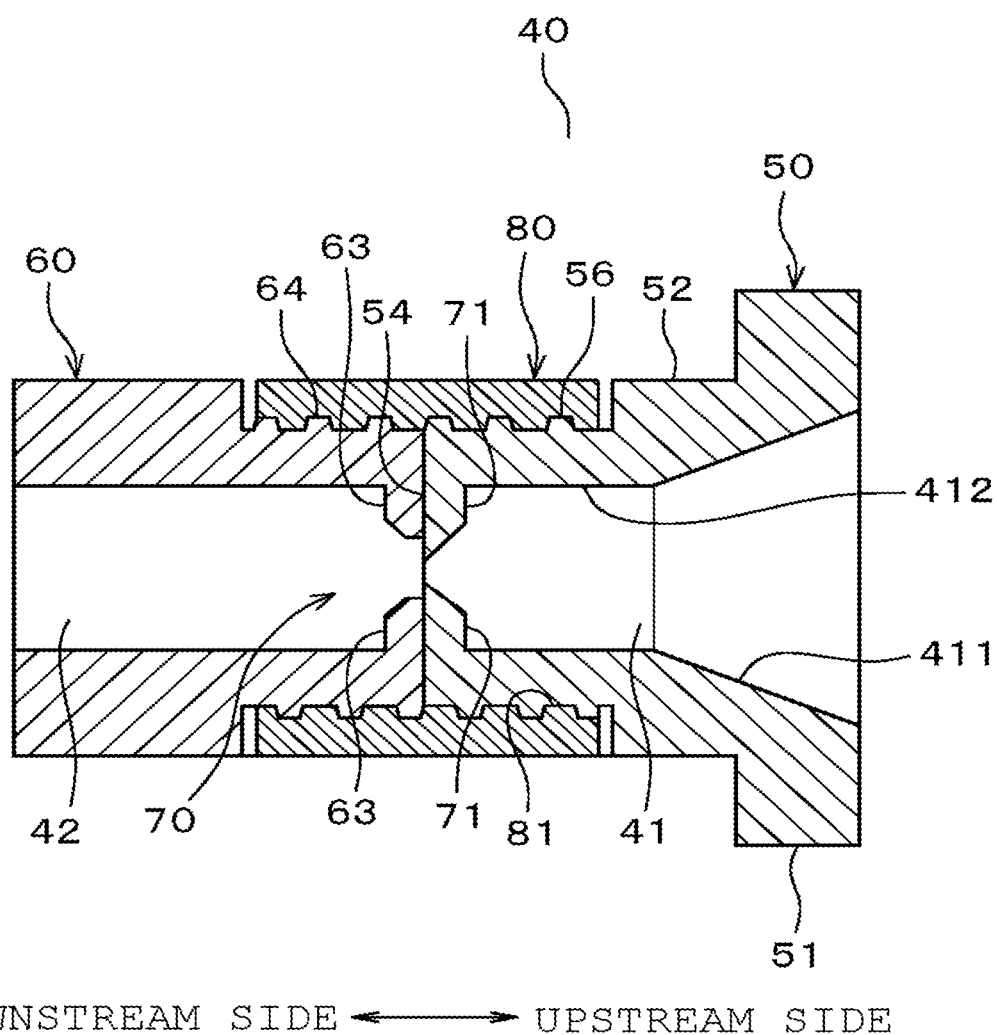
FIG. 17 is a cross sectional view of the minute bubble generator according to a third embodiment.

Next, a description will given on a third embodiment with reference to FIG. 17.

The third embodiment differs from each of the above described embodiments in that projections 63 are provided to the downstream flow path member 60. The third embodiment further differs front each of the above embodiments in the connection method of the upstream flow bath member 50 and the downstream flow path member 60.

More specifically, the minute bubble generator 40 is provided with projections 63 instead of the projections 55 of the second embodiment. The projections 63 are integral with the downstream flow path member 60 and are provided at the upstream end of the downstream flow path member 60. That is, in the present embodiment, the projection 63 are configured as a separate component front the colliding part 70, that is, as a separate component from the upstream flow path member 50. The shape of the projections 63 is the same as the shape of the projections the second embodiment.

Further in the present embodiment, the minute bubble generator 40 is provided with male thread parts 56 and 64 and female thread member 80 instead of the inserting part 53 and the inserted part 61 of the foregoing embodiments. That is, the upstream flow path member 50 and the downstream flow path member 60 are provided with the male thread parts 56 and 64 respectively. The male thread part 56 of the upstream flow path member 50 is provided at the outer peripheral part of the downstream side of the upstream flow path member 50, that is, at the outer peripheral part of the portion corresponding to the inserting part 53 in the foregoing embodiments. The male thread part 64 of the downstream flow path member 60 is provided at the outer peripheral part of the upstream side of the downstream flow path member 60, that is, at the outer peripheral part of the portion corresponding to the inserted part 61 in the foregoing embodiments.

The female thread member 80 is formed in a cylindrical shape and is provided with a female thread part 81 at the inner side of the cylindrical shape. The cuter diameter dimension of the female thread member 80 is equal to the outer diameter dimension of the intermediate part 52 of the upstream flow path member 50 and the outer diameter dimension of the downstream flow path member 60. The female thread part 81 configured so as to be engageable with the male thread parts 56 and 64 of the upstream flow path member 50 and the downstream flow path member 60. The dimension in the longer side direction of the female thread member 80, that is, the axial dimension of the cylindrical shape is shorter than the sum of the length dimension of the male thread part 56 of the upstream flow path member 50 and the length dimension of the male thread part 64 of the downstream flow path member 60.

The male thread part of the upstream flow path member 50 is threaded into one side of the female thread member 80 and the male thread part 64 of the downstream flow path member 60 is threaded into the other side of the female thread member 80. The downstream end of the upstream flow path member 50 and the upstream end of the downstream flow path member 60 are arranged face to face inside the female thread member 80. The minute bubble generator 40 is thus, assembled.

Thus, operation and effect similar to the foregoing embodiments can be obtained. Further, because the colliding part and the projections 63 are configured separately, the structure of the mold for resin molding the colliding part 70 and the projections 63 can be more simplified.

Fourth Embodiment

Next, a description will be given on a fourth embodiment with reference to FIG. 18.

The fourth embodiment differs from the foregoing embodiments in that the colliding part 70 is provided integrally with the downstream flow path member 60 and in that the relation of the insert part 53 and the inserted part 61 is opposite of that of the first and second embodiments.

That is, in the present embodiment, the colliding part 70 is provided closer to the upstream end relative to the lengthwise center of the downstream flow path 42, in this case, at the upper end of the downstream flow path member 60. The colliding part 70 is formed integrally with the downstream flow path member 60. Further, the upstream flow path member 50 is provided with an inserted part 57 instead of the inserting part 53 of the first embodiment. The downstream flow path member 60 is provided with an inserting part 65 instead of the inserted part 61 of the first embodiment.

The inserted part 57 and the inserting part 65 of the present embodiment are configured so as to be similar to the inserted part 61 and the inserting part 53 of the first embodiment. That is, though not shown in detail, the inserted part 57 of the present embodiment is provided with a structure corresponding to the deforming part 62 as is the case with the inserted part 61 of the first embodiment. The press fitting of the inserting part 65 into the inserted part 57 connects the upstream flow path member 50 with the downstream flow path member 60 to assemble the minute bubble generator 40.

The gap created by the connection of the upstream flow path member 50 and the downstream flow path member 60, that is, the gap between the inserted part 57 and the inserting part 65 extends to the upstream side of the colliding part 70. Thus, some of the water which has passed through upstream flow path 41 tries to leak outside the minute bubble generator 40 by passing through the gap without passing through the colliding part 70. This reduces the water passing through the colliding part 70 and as a result may reduce the number of minute bubbles generated at the colliding part 70.

Thus, the minute bubble generator 40 of the present embodiment is further provided with a seal member 44. The seal member 44 is an O ring configured by an elastic member such as rubber and is provided between the upstream flow path member 50 and the downstream flow path member 60. It is thus, possible to prevent some of the water passing through the upstream flow path 41 from leaking out of the minute bubble generator 40 through the gap. Thus, all of the water which has passed through the upstream flow path 41 can be efficiently passed through the colliding part 70 to thereby generate minute bubbles efficiently.

According to the present embodiment described above, it is possible to obtain the operation and effect similar to those of the first embodiment. In the first embodiment, the downstream end of the upstream flow path member 50, that is, the inserting part 53 is inserted to the inner side of the upstream end of the downstream flow path member 60, that is, the inserted part 61 as shown in FIG. 7 or the like. Thus, the water which has passed through the colliding part 70 does not directly contact the upstream end of the downstream flow path member 60. Because it is difficult for opposing water pressure to be exerted on the inserting part and the inserted part 61, it is difficult for the inserting part 53 and the inserted part 61 to be disengaged from one another.

Figure 18:
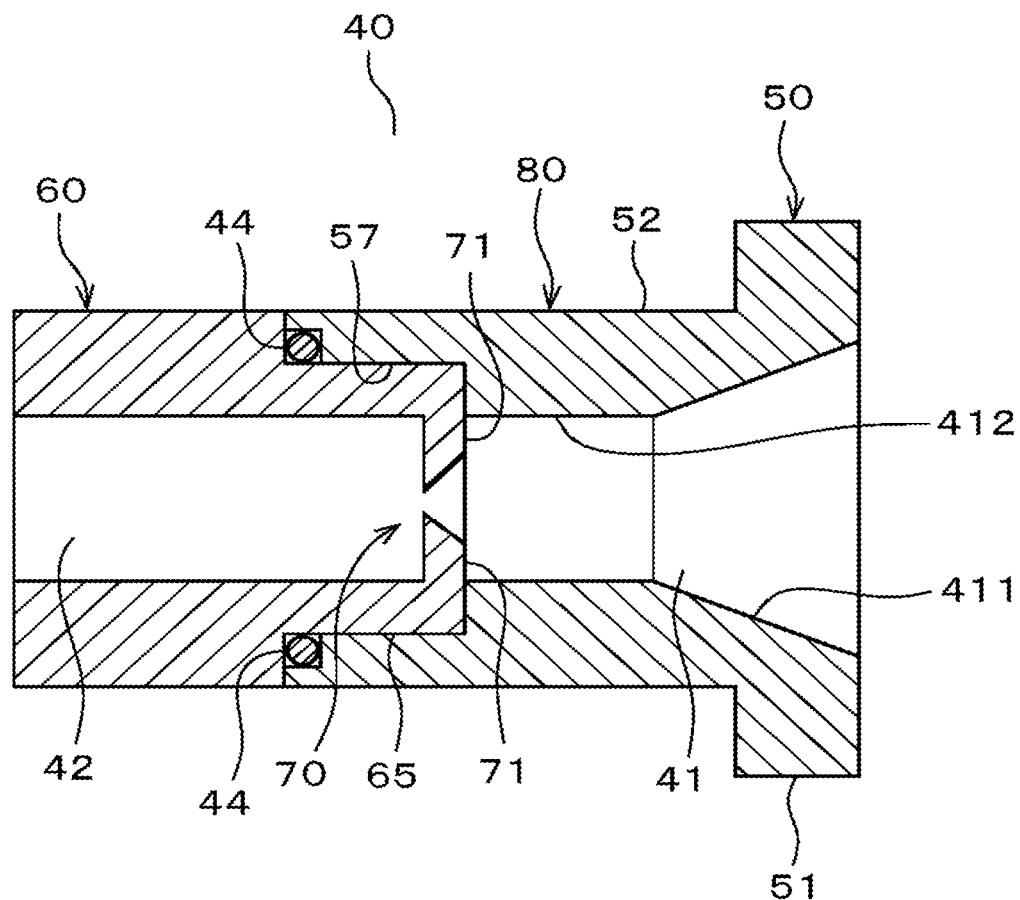
FIG. 18 is a cross sectional view of the minute bubble generator according to a fourth embodiment.

According to the present embodiment on the other hand, the upstream end of the downstream flow path member 60, that is, the inserting part 65 is inserted to the inner side of the downstream end of the upstream flow path member 50, that is, the inserted part 7 as illustrated in FIG. 18. Thus, the water which has not yet passed through the colliding part 70 directly contacts the upstream end of the downstream flow path member 60. Because opposing water pressure is easily exerted on the inserting part 65 and the inserted part 57, the inserted part 57 and the inserting part 65 are more easily disengaged from one another compared to the structure of the first embodiment. Thus, from the standpoint of difficulty of disengaging the upstream flow path member 50 and the downstream flow path member 60, the structure of the first embodiment is more preferable over the structure of the present embodiment.

Fifth Embodiment

Figure 19:
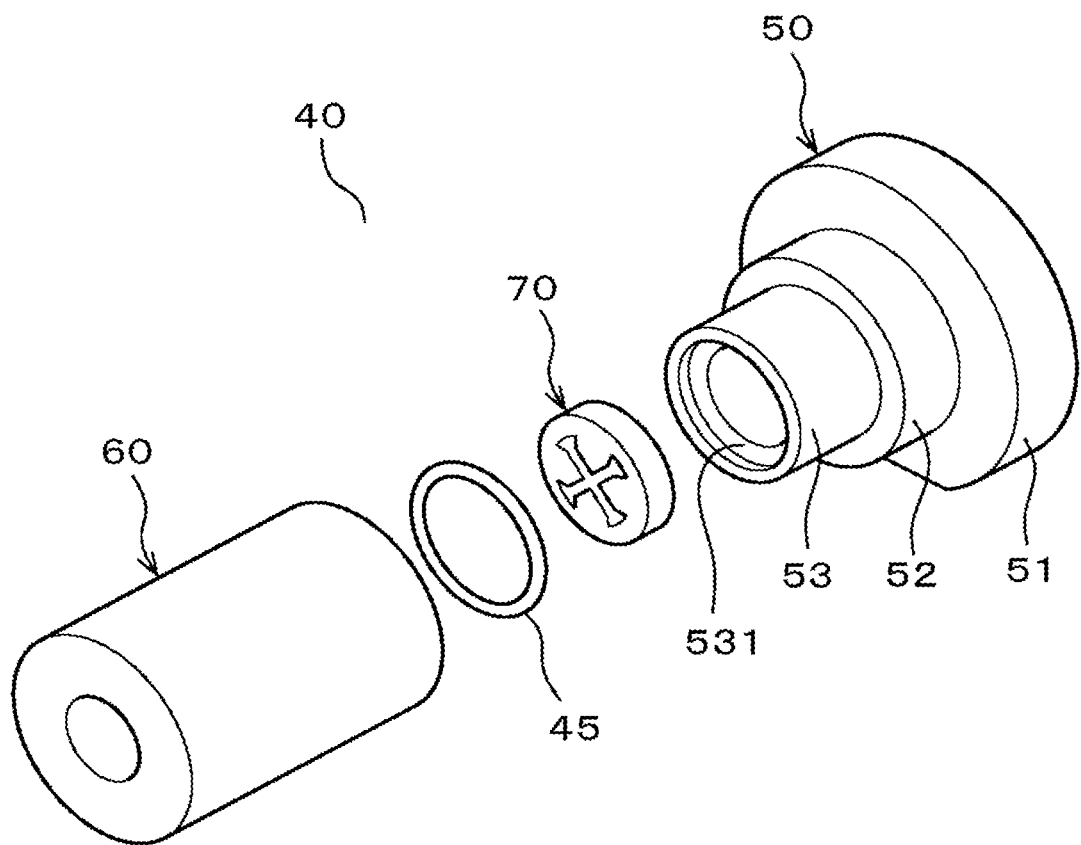
FIG. 19 pertains to a fifth embodiment and is an exploded perspective view looking at the minute bubble generator from the downstream side.
Figure 20:
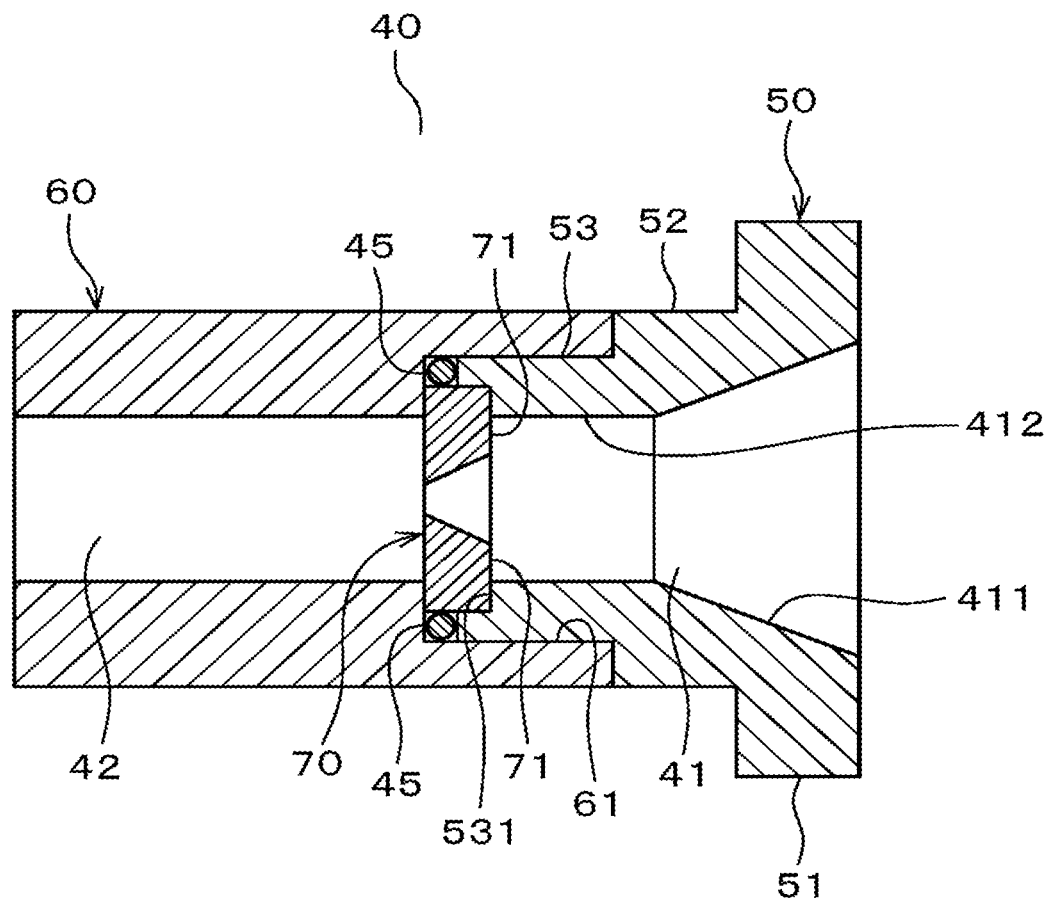
FIG. 20 is a cross sectional view of the minute bubble generator according to the fifth embodiment.

Next, a description will be given on a fifth embodiment with reference to FIGS. 19 and 20.

The fifth embodiment differs from the foregoing embodiments in that the colliding part 70 is configured separately from the flow path members 50 and 60. That is, in the present embodiment, the upstream flow path member 50, the downstream flow path member 60, and the colliding part 70 are each configured as separate components.

In this case, the colliding part 70 is configured in a circular disc shape as a whole. The outer diameter dimension of the colliding part 70 is greater than the inner diameter dimensions of the upstream flow path 41 and the downstream flow path 42. As illustrated in FIG. 20, the colliding part 70 is provided between the tip of the inserting part 53 and the bottom of the inserted part 61. That is, the colliding part 70 is provided in the downstream end side of the upstream flow path member 50 and in the upstream end side of the downstream flow path member 60.

In this case, a counterbore 531 is formed at the tip of the inserting part 53. The counterbore 531 is configured so that some or all of the thickness direction of the colliding part 70 can be fitted therein. A structure similar to the counterbore 531 may be provided at the bottom of the inserted part 61 as well. Further, a seal member 45 is provided between the upstream flow path member 50 and the downstream flow path member 60, in this case, at the outer peripheral portion of the colliding part 70. As was the case for the seal member 44 of the fourth embodiment, the seal member 45 is an O ring configured by an elastic member for preventing some of the water passed through the upstream flow path 41 from leaking to the outside of the minute bubble generator 40 through the gap between the colliding part 70 and the flow path members 50 and 60.

It is thus, possible to obtain the operation and effect similar to those of the foregoing embodiments. Further, the colliding part 70 is configured as a separate component from the flow path members 50 and 60 and thus, when the colliding part 70 deteriorates or is subjected to manufacturing failure for example, it will suffice to replace the colliding part 70 and the flow path members 50 and 60 need not be replaced. It is thus, possible to use the flow path members 50 and 60 effectively and therefore, is economic.

Sixth Embodiment

Figure 21:
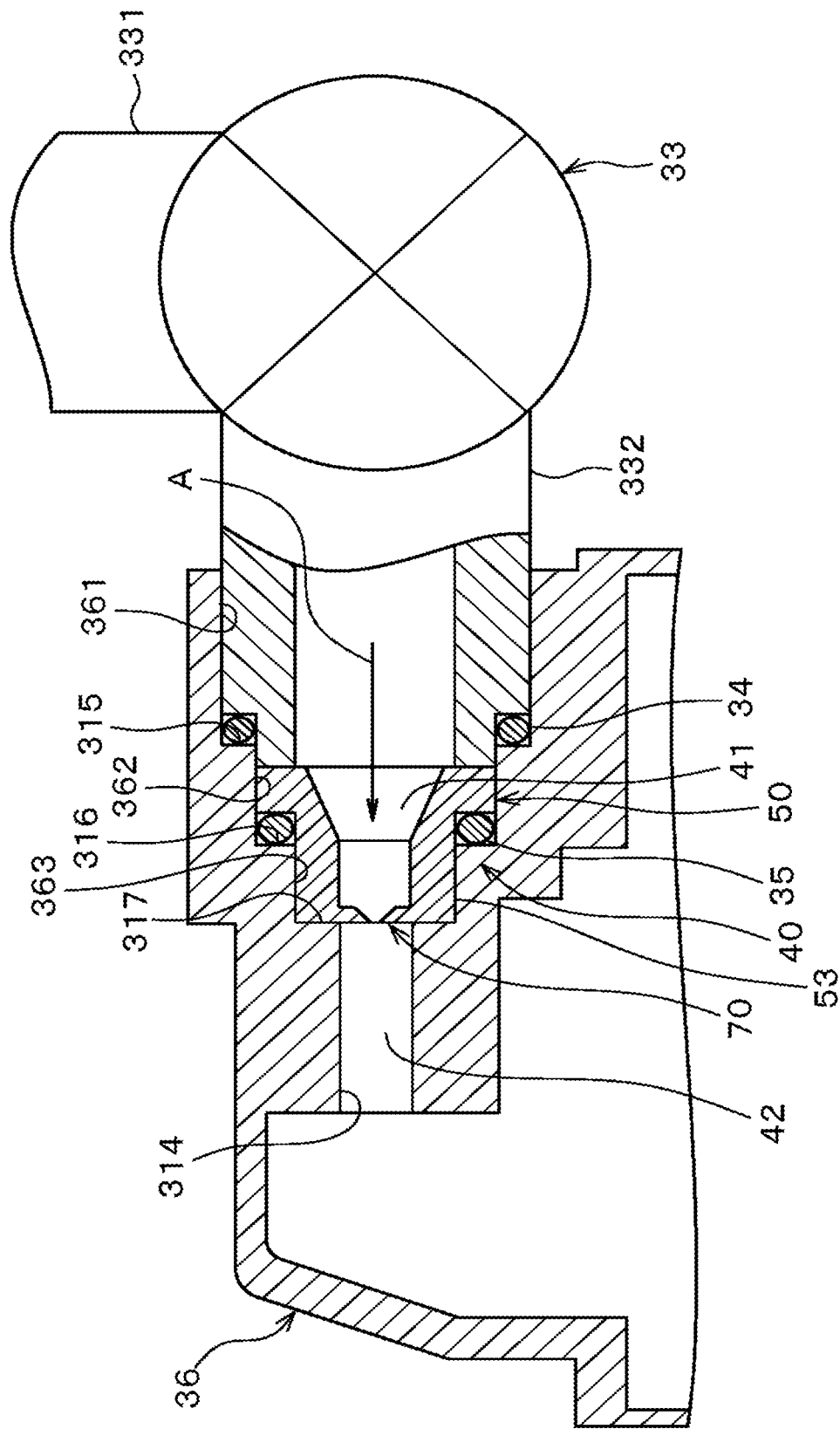
FIG. 21 pertains to a sixth embodiment and is a partial cross sectional view illustrating a state in which the minute bubble generator is installed in the water feeding case.

Next, a description will be given on a sixth embodiment with reference to FIG. 21.

The minute bubble generator 40 of the sixth embodiment differs from the foregoing embodiments in that it is not provided with the downstream flow path member 60. More specifically, the minute bubble generator 40 of the present embodiment is configured by the upstream flow path member 50. The upstream flow path member 50 is configured to be substantially the same as the upstream flow path member 50 of the first embodiment. That is, the upstream flow path member 50 is integrally provided with the colliding part 70. In this case, the inserting part 53 of the upstream flow path member 50 of the above described embodiment also serves as the intermediate part 52.

Further, the water feeding device 30 of the present embodiment is provided with a water feeding case 36 instead of the water feeding case 31 of the first embodiment. The water feeding case 36 is integrally provided with the downstream flow path 42. That is, the water feeding case 36 of the present embodiment is provided with a first storage part 361 and a second storage part 362 as was the case for the water feeding case 31 of the first embodiment. In this case, the first storage part 361 corresponds to the first storage part 311 and the second storage part 362 corresponds to the second storage part 312.

Further, the water feeding case 36 of the present embodiment is integrally provided with the downstream flow path 42 and the inserted part 363 instead of the third storage part 313 of the first embodiment. In this case, the downstream flow path 42 of the present embodiment also serves as the communicating part 314 of the first embodiment. That is, the downstream flow path 42 communicates directly into the water feeding case 36.

The inserted part 363 is provided in the up side of the downstream flow path 42. The inserted part 363 is configured in the same manner as the inserted part 61 of the first embodiment except for the fact that it is provided in the water feeding case 36 and except for the difference in the inner diameter dimension. That is, though not illustrated in detail, the inserted part 363 of the present embodiment is also provided with a structure corresponding to the deforming part 62 as was the case for the inserted part 61 of the first embodiment. The upstream flow path member 50 is connected directly to the water feeding case 36 by press fitting the inserting part 53 into the inserted part 363. Thus, the minute bubble generator 40 of the present embodiment is installed in the water feeding case 36.

The above described configuration also provides the operation and effect similar to those of the first embodiment, etc.

Further, according to the present embodiment, it is possible to reduce the number of parts of the minute bubble generator 40 and further reduce the man-hours required in assembling the minute bubble generator 40. As a result, it is possible to reduce the manufacturing cost of the water feeding device 30 having the minute bubble generator 40 built in to it.

In the foregoing embodiments, the liquid to which the minute bubble generator 40 is applied is not limited to water.

Further, the minute bubble generator 40 is not limited to application to home appliances such as a washing machine but may be applied to fields such as a household and industrial dish washers and high pressure washers, substrate cleaning apparatus used in semiconductor manufacturing, water purifying devices, and the like.

Further, the minute bubble generator 40 can be widely applied to fields other than cleaning of substances and water purification such as the field of beauty care.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A minute bubble generator, comprising:
   a flow path member including a flow path allowing a liquid to pass therethrough; and
   a colliding part provided in the flow path and generating minute bubbles in the liquid passing through the flow path by locally reducing a cross sectional area of the flow path, wherein
   the flow path member includes an upstream flow path member having an upstream flow path which is a flow path in an upstream side of the colliding part and a downstream flow path member configured as a separate component from the upstream flow path member and having a downstream flow path which is a flow path in a downstream side of the colliding part,
   the colliding part is formed integrally with the upstream flow path member and is provided closer to a downstream end relative to a lengthwise center of the flow path,
   the upstream flow path member is provided with an inserting part,
   the downstream flow path member is provided with an inserted part which receives an insertion of the inserting part, and
   an upstream end of the downstream flow path member is located upstream with respect to the colliding part.

2. The minute bubble generator according to claim 1, wherein an inner diameter of the downstream flow path is equal to or less than an inner diameter of the upstream flow path.

3. The minute bubble generator according to claim 1, further comprising:
   a deforming part provided to either of the inserting part and the inserted part and connecting the inserting part and the inserted part in a pressed state by deforming when the inserting part is inserted into the inserted part.

4. The minute bubble generator according to claim 1, further comprising a narrowing part provided in the upstream side of the colliding part and formed in a tapered shape in which an inner diameter thereof becomes smaller from an upstream side to a downstream side.

5. A home appliance using water provided with the minute bubble generator according to claim 1.

6. A minute bubble generator, comprising:
   a flow path member including a flow path allowing a liquid to pass therethrough; and
   a colliding part provided in the flow path and generating minute bubbles in the liquid passing through the flow path by locally reducing a cross sectional area of the flow path, wherein
   the colliding part is informed integrally with the flow path member and is provided closer to an upstream end or a downstream end relative to a lengthwise center of the flow path,
   the colliding part is provided at a downstream end of the flow path member, and
   an end surface in a downstream side of the colliding part is flat.

7. A minute bubble generator, comprising:
   a flow path member including a flow path allowing a liquid to pass therethrough; and
   a colliding part provided in the flow path and generating minute bubbles in the liquid passing through the flow path by locally reducing a cross sectional area of the flow path, wherein
   the colliding part is informed integrally with the flow path member and is provided closer to an upstream end or a downstream end relative to a lengthwise center of the flow path,
   the colliding part is provided at a downstream end of the flow path member, and
   the flow path member is further provided with a projection contacting a surface in a downstream side of the colliding part and projecting toward a downstream side of the flow path from the surface in the downstream side of the colliding part.

8. The minute bubble generator according to claim 7, wherein
   the projection is provided integrally with the colliding part, and
   a periphery of the projection is flat.

9. The minute bubble generator according to claim 7, wherein
   the flow path member includes an upstream flow path member having an upstream flow path which is a flow path in an upstream side of the colliding part and a downstream flow path member configured as a separate component from the upstream flow path member and having a downstream flow path which is a flow path in a downstream side of the colliding part,
   the colliding part is formed integrally with the upstream flow path and is provided at a downstream end of the upstream flow path member, and
   the projection is formed integrally with the downstream flow path and is provided at an upstream end of the downstream flow path member.

* * * * *